(12) United States Patent
Sano

(10) Patent No.: US 7,688,523 B2
(45) Date of Patent: Mar. 30, 2010

(54) IMAGE PICKUP LENS

(75) Inventor: Eigo Sano, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/198,576

(22) Filed: Aug. 26, 2008

(65) Prior Publication Data

US 2009/0059392 A1    Mar. 5, 2009

(30) Foreign Application Priority Data

Aug. 29, 2007 (JP) .............................. 2007-222313

(51) Int. Cl.
*G02B 9/00* (2006.01)
*G02B 3/02* (2006.01)
*G02B 1/00* (2006.01)
(52) U.S. Cl. ....................... 359/715; 359/772
(58) Field of Classification Search ......... 359/708–715, 359/754–758, 763–766, 771–778; 369/112.01–112.29
See application file for complete search history.

(56) References Cited

U.S. PATENT DOCUMENTS

2007/0081259 A1 * 4/2007 Noda .......................... 359/774

2008/0174884 A1 * 7/2008 Liao ........................... 359/708

FOREIGN PATENT DOCUMENTS

| JP | 2002-265530 | 12/2002 |
| JP | 2002-365529 | 12/2002 |
| JP | 2002-365531 | 12/2002 |
| JP | 2004-341013 | 12/2004 |

* cited by examiner

*Primary Examiner*—Darryl J Collins
(74) *Attorney, Agent, or Firm*—Finnegan, Henderson, Farabow, Garrett & Dunner, L.L.P.

(57) ABSTRACT

An image pickup lens is provided for forming an image of an object on a photoelectrical converter of a solid-state image pickup element. The image pickup lens includes, in order from an object side thereof: an aperture stop; a first lens having a positive refractive power; a second lens having a negative refractive power and including a concave surface facing an image side of the image pickup lens; a third lens including an aspheric surface; and a fourth lens including an aspheric surface. The image pickup lens satisfies predetermined conditions relating to a curvature radius of the surface of the second lens facing the image side and a refractive power of the third lens.

14 Claims, 16 Drawing Sheets

EXAMPLE 1

EXAMPLE 2

EXAMPLE 3

EXAMPLE 4

EXAMPLE 5

EXAMPLE 7

EXAMPLE 8

IMAGE PICKUP LENS

This application is based on Japanese Patent Application No. 2007-222313 filed on Aug. 29, 2007, in Japanese Patent Office, the entire content of which is hereby incorporated by reference.

TECHNICAL FIELD

The present invention relates to a small-sized image pickup lens that forms an image of an object on a solid-state image pickup element such as an image sensor of a CCD type or an image sensor of a CMOS type, and in particular, to an image pickup lens that is favorably incorporated in an image pickup unit for a mobile terminal.

BACKGROUND

In recent years, with a trend toward higher performance and toward downsizing of an image pickup apparatus employing a solid state image pickup element such as an image sensor of a CCD (Charged Coupled Device) type or an image sensor of a CMOS (Complementary Metal oxide Semiconductor) type, a cell-phone and a mobile information terminal each being equipped with an image pickup apparatus are spreading. Demands for further downsizing and further higher performance for an image pickup lens equipped on the image pickup apparatus are increased. As the image pickup lens to be used in this way, an image pickup lens in a 4-element structure is suggested, because it can exhibit higher performance when comparing with a lens in a 2-element structure or a 3-element structure.

As the image pickup lens in the 4-element type, there is disclosed an image pickup lens of the so-called Inverted Ernostar type that is composed of a first lens having positive refractive power, a second lens having negative refractive power, a third lens having positive refractive power and a fourth lens having positive refractive power, in this order from the object side, aiming to exhibit high performance (For example, JP-A No. 2004-341013).

Further, there is disclosed an image pickup lens of so-called telephoto type that is composed of a first lens having positive refractive power, a second lens having negative refractive power, a third lens having positive refractive power and a fourth lens having negative refractive power, in this order from the object side, aiming to shorten the total length which is a distance from the lens surface on the object side of the total image pickup lens to the focal point on the image side on the optical axis (for example, JP-A Nos. 2002-365529, 2002-365530, and 2002-365531).

Since the image pickup lens described in the aforesaid JP-A No. 2004-341013 is of the Inverted Ernostar type, the fourth lens is a positive lens. In such image pickup lens, a position of a principal point of the optical system comes to the image side and its back focus becomes to be longer compared with an occasion where the fourth lens is a negative lens as in the telephoto type, which is disadvantageous for downsizing. In addition, only one lens among four lenses in the image pickup lens has negative refractive power, which makes correction of Petzval's sum to be difficult and causes a fear that excellent performance cannot be secured on a peripheral part of an image which is picked-up by the image pickup lens.

In the image pickup lenses described in JP-A Nos. 2002-365529, 2002-365530, and 2002-365531, an angle of view for photographing is small and aberration correction is insufficient. Further, when the total lens length is shortened, there is caused a problem that the image pickup lens hardly cope with an image pickup element with larger number of pixels due to deterioration of lens performance caused by the shortened total lens length.

SUMMARY

The present invention has been achieved in view of the aforesaid problems, and an object of the present invention is to provide an image pickup lens in 4-element structure which exhibits various aberrations corrected satisfactorily in spite of its size, and smaller size than a conventional type.

An embodiment of the present invention is an image pickup lens for forming an image of an object on a photoelectrical converter of a solid-state image pickup element. The image pickup lens comprises, in order from an object side thereof: an aperture stop; a first lens having a positive refractive power; a second lens having a negative refractive power and comprising a concaved surface facing an image side of the image pickup lens; a third lens comprising an aspheric surface; and a fourth lens comprising an aspheric surface. The image pickup lens satisfies the predetermined conditions relating to a curvature radius of the surface of the second lens facing the image side and a refractive power of the third lens.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
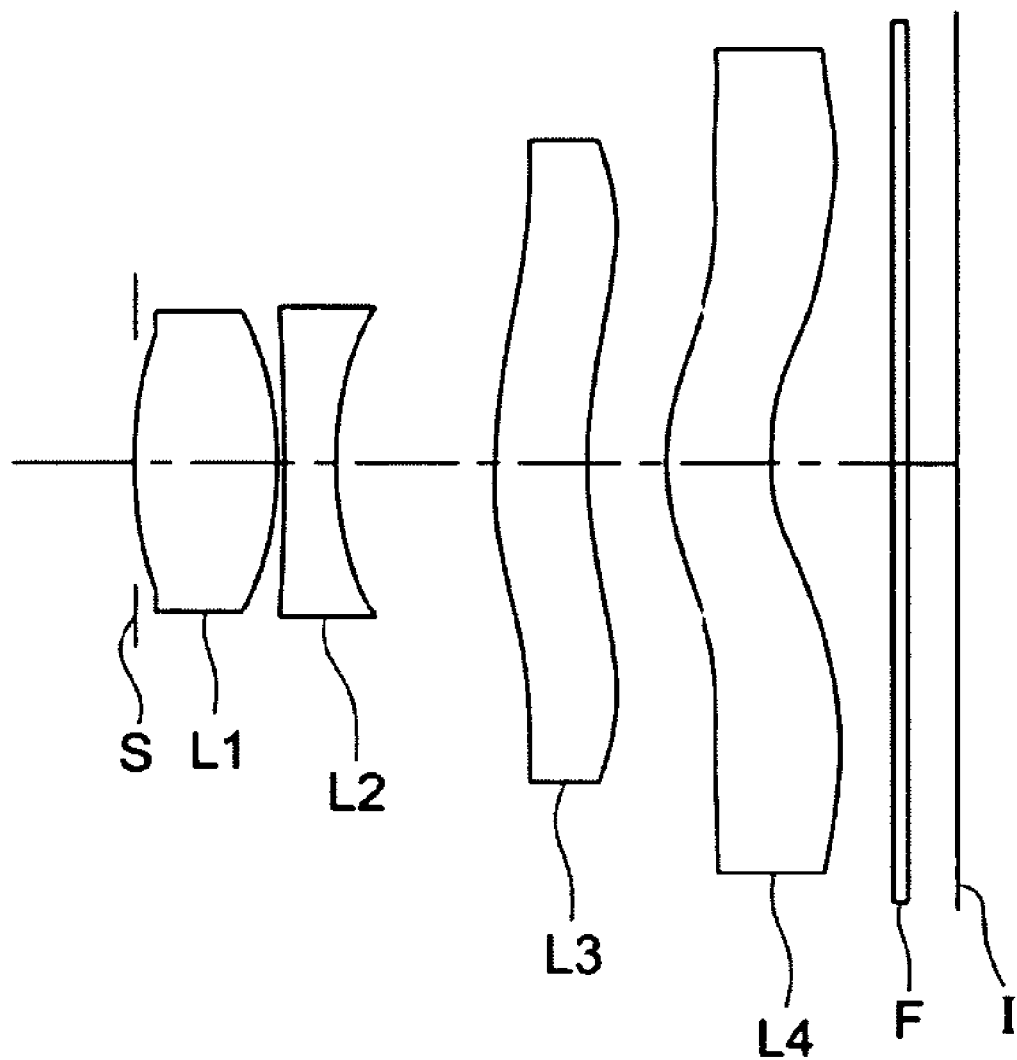
FIG. 1 is a sectional View of a lens in Example 1.

A preferred embodiment of the invention is an image pickup lens for forming an image of an object on a photoelectrical converter of a solid-state image pickup element. The image pickup lens comprises, in order from an object side thereof: an aperture stop; a first lens having a positive refractive power; a second lens having a negative refractive power and comprising a concaved surface facing an image side of the image pickup lens; a third lens comprising an aspheric surface; and a fourth lens comprising an aspheric surface. The image pickup lens satisfies the following conditional expressions.

$$0.2 < r4/f < 0.7 \qquad (1)$$

$$0 \leq |P3/P| < 0.7 \tag{2}$$

In the expressions, r4 represents a curvature radius of the surface of the second lens facing the image side, f represents a focal length of a total system of the image pickup lens, P3 represents a refractive power of the third lens, and P represents a refractive power of the total system of the image pickup lens.

The embodiment has a following basic configuration for attaining an object to acquire the small-sized image pickup lens that exhibits satisfactorily corrected aberrations, and the basic configuration includes an aperture stop, a first lens having positive refractive power, a second lens having negative refractive power and including a concave surface facing the image side of the image pickup lens, a third lens having positive or negative refractive power and including at least one aspheric surface, and a fourth lens having positive or negative refractive power and including at least one aspheric surface, in this order from the object side of the image pickup lens.

By arranging the positive first lens and the negative second lens each having relatively large refractive power in this order from the object side, the configuration is formed as a telephoto type that is advantageous for downsizing in terms of a total length of the image pickup lens. Succeedingly, by arranging the third lens and the fourth lens each having relatively small refractive power and serving as a correcting lens so that both the third and fourth lenses may correct various aberrations on peripheral portions, the configuration compatibly enables to downsize in terms of a total length of the image pickup lens and to provide good performance on peripheral portions.

Further, by forming the surface of the second lens on the image side to be a concave surface, Petzval's sum can be corrected easily, and an image pickup lens in which an excellent image forming performance is secured up to a peripheral part of an image which is picked-up by the image pickup lens, can be obtained. In addition, by forming the third and fourth lenses each served as a correction lens to include at least one aspheric surface, various aberrations on peripheral portions on an image picked-up by the image pickup lens can be corrected satisfactorily.

In addition, by arranging an aperture stop to be closest to the object side in the image pickup lens, an exit pupil position can be arranged to be farther from an image pickup surface, and an incident angle of principal ray of the light flux that forms an image on a peripheral portion of an image pickup surface of solid-state image pickup element (in other words, an angle made by principal ray and an optical axis) can be controlled to be small. Thus, it is possible to secure the so-called telecentricity of the image pickup lens. Even when a mechanical shutter is needed, the mechanical shutter can be arranged to be closest to the object side in the image pickup lens, and the configuration can provide an image pickup lens whose total length is short.

Conditional expression (1) prescribes conditions for setting a radius of curvature of the second lens on the image side properly. By forming a surface of the second lens on the image side to be a strong diverging surface that satisfies conditional expression (1), longitudinal chromatic aberration generated on the first lens having positive refractive power can be satisfactorily corrected by the second lens. In particular, by making the value of r4/f to be greater than the lower limit of conditional expression (1), the radius of curvature does not become too small, and workability of a metal mold for injection molding is not affected adversely. On the other hand, by making the value of r4/f to be lower than the upper limit of conditional expression (1), it is possible to satisfactorily correct chromatic aberration while keeping Petzval's sum to be small.

It is more preferable that the value of r4/f is greater than 0.3, and it is further preferable that the value of r4/f is greater than 0.4. Further, it is preferable that the value of r4/f is smaller than 0.65, and it is more preferable that the value of r4/f is smaller than 0.65.

Conditional expression (2) prescribes conditions for setting refractive power properly for the third lens. By making the value of |P3/P| to be smaller than the upper limit of conditional expression (2), it is possible to arrange a composite principal point of the total system of image pickup lens to be closer to the object side, and it is possible to shorten the total length of the image pickup lens.

It is more preferable that the value of |P3/P| is greater than 0.1. It is also preferable that the value of |P3/P| is smaller than 0.6, and it is more preferable that the value of |P3/P| is smaller than 0.55. Further, it is furthermore preferable that the value of |P3/P| is smaller than 0.35.

With respect to a scale of a small-sized image pickup lens, a target of the present embodiment is downsizing of the image pickup lens at the level satisfying the following expression. By satisfying this range, the total length of the image pickup lens can be made short, and an outside diameter of the lens can be made small synergistically. It enables downsizing and weight reduction of the overall image pickup apparatus.

$$L/f < 1/30 \tag{10}$$

In the expression, L represents a distance from a lens surface closest to the object side in the total image pickup lens to the focal point on the image side on the optical axis, and f represents a focal length of the total image pickup lens.

The focal point on the image side mentioned in the present specification means an image point formed when a collimated light beam that is in parallel with the optical axis enters an image pickup lens. When parallel plates such as an optical lowpass filter, a infrared blocking filter, and a seal glass of solid state image pickup element package are arranged between a surface of the image pickup lens that is closest to the image side and a position of a focal point on the image side, a value of the aforesaid L is assumed to be calculated under the condition that a portion of the parallel plate is converted to an air-distance. The expression (10) more preferably has a range of the following expression.

$$L/f < 1.25 \tag{10'}$$

It is preferable that the image pickup lens of the embodiment satisfies the following conditional expressions.

$$10 < v2 < 35 \tag{3}$$

$$10 < v3 < 35 \tag{4}$$

In these expressions, v2 represents an Abbe number of the second lens, and v3 represents an Abbe number of the third lens.

The conditional expressions (3) and (4) properly regulate the Abbe numbers of the second lens and the third lens and prescribes conditions for satisfactorily correcting chromatic aberration. When a material having relatively great dispersion is used for the negative second lens, longitudinal chromatic aberration can be corrected satisfactorily, but a peripheral ray of light is deflected out greatly, resulting in great magnification chromatic aberration on the periphery because a surface of the second lens on the image side is a strong diverging surface. Therefore, it becomes possible to correct magnification chromatic aberration on the periphery generated on the second lens with the third lens by using a material having a relatively large dispersion even for the third lens.

However, if the value of v2 turns out to be smaller than the lower limit of conditional expression (3) and the value of v3 turns out to be smaller than the lower limit of conditional expression (4), magnification chromatic aberration generated on the second lens is hardly corrected fully by the third lens, resulting in a growth of magnification chromatic aberration. On the other hand, if the value of v2 turns out to be greater than the upper limit of conditional expression (3) and the value of v3 turns out to be greater than the upper limit of conditional expression (4), correction of the longitudinal chromatic aberration becomes insufficient, though magnification chromatic aberration can be controlled to be small. To avoid these troubles, it is preferable that v2 and v3 are made to be within ranges respectively of conditional expressions (3) and (4), and it is more preferable to make them to be within ranges of the following expressions.

$$15 < v2 < 32 \qquad (3')$$

$$15 < v3 < 32 \qquad (4')$$

It is preferable that the image pickup lens relating to the invention satisfies the following conditional expressions.

$$1.55 < n2 < 2.10 \qquad (5)$$

$$1.55 < n3 < 2.10 \qquad (6)$$

In these expressions, n2 represents a refractive index of the second lens for d line, and n3 represents a refractive index of the third lens for d line.

The conditional expressions (5) and (6) prescribe the conditions for satisfactorily correcting the chromatic aberration and curvature of field of the overall image pickup lens. When the values of n2 and n3 are made to be greater respectively than the lower limits of the conditional expressions (5) and (6), it is possible to maintain refractive powers properly respectively of the second lens and the third lens having relatively large dispersion, whereby, chromatic aberration and curvature of field can be corrected satisfactorily. On the other hand, by making the values of n2 and n3 to be smaller respectively than the upper limit of conditional expressions (5) and (6), it is possible to use glass material that is easily available for making a lens. Incidentally, it is more preferable that n2 and n3 are respectively within ranges of the following expressions.

$$1.55 < n2 < 2.00 \qquad (5')$$

$$1.55 < n3 < 2.00 \qquad (6')$$

It is preferable that the image pickup lens relating to the invention satisfies the following conditional expression.

$$0.30 < f1/f < 0.85 \qquad (7)$$

In the expression, f1 represents a focal length of the first lens, and f represents a focal length of the total system of the image pickup lens.

Conditional expression (7) properly sets a focal length of the first lens, and prescribes conditions to attain shortening of the total length of the image pickup lens and correction of aberration properly. By making the value of f1/f to be lower than the upper limit of conditional expression (7), it is possible to maintain properly the refractive power of the first lens, and it is possible to arrange a composite principal point of the total system of image pickup lens to be closer to the object side, and it is possible to shorten the total length of the image pickup lens. On the other hand, by making the value of f1/f to be greater than the lower limit of conditional expression (7), it is possible to make the refractive power of the first lens not to become too great, and it is possible to control higher order spherical aberration and coma generated on the first lens to be small.

It is more preferable that the value of f1/f is greater than 0.45. Also, it is more preferable that the value of f1/f is smaller than 0.85, and it is further more preferable that the value of f1/f is smaller than 0.75. Alternatively, the value of f1/f more preferably satisfies the following conditional expression.

$$0.45 < f1/f < 0.65 \qquad (7')$$

It is preferable that the image pickup lens of the embodiment satisfies the following conditional expression.

$$0.08 < d23/f < 0.35 \qquad (8)$$

In the expression, d23 represents a length of an air space between the second lens and the third lens on an optical axis, and f represents a focal length of the total system of the image pickup lens.

Conditional expression (8) prescribes conditions for setting a length of an air space between the second lens and the third lens on an optical axis properly. By making the value of d23/f to be smaller than the upper limit of conditional expression (8), a peripheral ray of light can be deflected out properly, and curvature of field, distortion and magnification chromatic aberration at the periphery can be corrected satisfactorily. On the other hand, by making the value of d23/f to be greater than the lower limit of conditional expression (8), peripheral positive refractive power of the third lens can be maintained properly, magnification chromatic aberration can be corrected satisfactorily, and peripheral telecentricity can easily be secured. It is more preferable that the value of d23/f is made to be within a range of the following expression.

$$0.10 < d23/f < 0.30 \qquad (8')$$

It is preferable that the image pickup lens of the embodiment satisfies the following conditional expression.

$$15 < v1 - v2 < 65 \qquad (9)$$

In the expression, v1 represents Abbe's number of the first lens, and v2 represents Abbe's number of the second lens.

Conditional expression (9) prescribes conditions for correcting chromatic aberration of the total system of the image pickup lens. By making the value of v1−v2 to exceed the lower limit of conditional expression (9), it is possible to correct longitudinal chromatic aberration and magnification chromatic aberration in a well-balanced manner. On the other hand, by making the value of v1−v2 to be lower than the upper limit of conditional expression (9), it is possible to use glass material that is easily available for making a lens.

It is more preferable that the value of v1−v2 exceeds 19 and it is further more preferable that it exceeds 20. Further, it is further more preferable that the value of v1−v2 is kept within a range of the following expression.

$$20 < v1 - v2 < 65 \qquad (9')$$

In the image pickup lens relating of the embodiment, it is preferable that a surface of the second lens facing the image side has an aspheric shape such that a negative refractive power at a position on the surface of the second lens becomes smaller as the position moves from a center to a periphery of the surface of the second lens.

In the embodiment, when the surface of the second lens on the image side is formed to be an aspheric surface wherein negative refractive power becomes weaker gradually toward the periphery from the center, a ray of light is not deflected out on the periphery, and excellent telecentricity on the periphery can be secured.

In the image pickup lens of the embodiment, it is preferable that a surface of the third lens facing the image side has an aspheric shape such that a negative refractive power at a position on the surface of the third lens becomes smaller as the position moves from a center to a periphery of the surface of the third lens.

In the embodiment, by forming a surface of the third lens on the image side to be an aspheric surface wherein negative refractive power becomes weaker gradually toward the periphery from the optical axis, telecentricity of a light flux on the image side can be secured easily. Further, with respect to the surface of the second lens on the image side, it is not necessary to weaken negative refractive power greatly on the periphery of the lens, and it becomes possible to correct off-axis aberration satisfactorily.

In the image pickup lens of the embodiment, it is preferable that a surface of the fourth lens facing the image side has an aspheric shape such that a negative refractive power at a position on the surface of the fourth lens becomes smaller as the position moves from a center to a periphery of the surface of the fourth lens, and the surface of the fourth lens facing the image side has an inclination point.

In the embodiment, by forming a surface of the fourth lens on the image side to be an aspheric surface wherein negative refractive power becomes gradually weaker toward the periphery from the optical axis and an inflection point exists, telecentricity of a light flux on the image side can be secured easily. Further, with respect to the surface of the second lens on the image side, it is not necessary to weaken negative refractive power greatly on the periphery of the lens, and it becomes possible to correct off-axis aberration satisfactorily. "The inflection point" in this case means a point on the aspheric surface where a tangential plane at an apex on the aspheric surface becomes a plane perpendicular to an optical axis, on a curve of a lens section form within an effective radius.

In the image pickup lens of the embodiment, each of the first to fourth lenses may be formed of a plastic material.

There have recently been developed small-sized solid state image pickup elements, aiming downsizing the total size of the solid-state image pickup apparatus. These solid state image pickup elements have a small pixel pitch, compared with the solid state image pickup element with the same number of pixels, resulting in a small size of an image pickup surface. Since an image pickup lens for the solid state image pickup element having the small image pickup surface of this kind is required to have a relatively short focal length of the total length, a radius of curvature and an outside diameter of each lens tend to be considerably small. Therefore, if all lenses are plastic lenses manufactured through injection molding, a large number of lenses can be manufactured at low cost, even when their radius of curvatures and outside diameters are small, which is different from a glass lens manufactured through time-consuming grinding processing.

In the image pickup lens of the embodiment, each of the first and second lenses may be formed of a glass material, and each of the third and fourth lenses may be formed of a plastic material.

In the embodiment, it is possible to control the total cost of the image pickup lens to be low by using plastic materials for the third lens and the fourth lens, even when restraining fluctuations of image point positions for the total image pickup lens system in the case of temperature changes by forming the first lens and the second lens both having relatively strong refractive power with glass materials. Further, if the first lens is formed with glass material, it is possible to constitute a total lens without exposing a plastic lens to the outside, and to avoid a problem of cracks of the first lens.

In the image pickup lens of the embodiment, each of the second lens and the third lens may be formed of a same material.

In the embodiment, the second lens and the third lens are made of the same material, which reduces the number of types of materials to be used, and to reduce manufacturing cost.

As stated above, the embodiment makes is possible to provide an image pickup lens in 4-element structure in which various aberrations are properly corrected in spite of its small size.

One of the preferred embodiment will be explained in detail as follows, referring to examples. Examples of the image pickup lenses of will be shown below. The following symbols are used in each Example.

f: Focal length of the total system of the image pickup lens
fB: Back focus
F: F number
2Y: Diagonal line of image pickup surface of solid state image pickup element
ENTP: Entrance pupil position (Distance from the first surface to entrance pupil position)
EXTP: Exit pupil position (Distance from image pickup surface to exit pupil position)
H1: Front principal point position (Distance from the first surface to front principal point position)
H2: Rear principal point position (Distance from final surface to rear principal point position)
R: Radius of curvature
D: Surface distance along the optical axis
Nd: Refractive index of lens material for d line
vd: Abbe number of lens material In each Example, a surface labeled by its surface number followed by an asterisk "*" is an aspheric surface, and a shape of the aspheric surface is expressed by the following expression (11), where an apex of the surface is defined as the origin, X-axis extends along the optical axis and h represents a height in the direction perpendicular to the optical axis.

$$X = \frac{h^2/R}{1+\sqrt{1-(1+K)h^2/R^2}} + \sum A_i h^i \tag{11}$$

In the expression, $A_i$ represents an aspheric surface coefficient of $i^{th}$ order, R represents a radius of curvature, and K represents a conic constant.

EXAMPLE 1

Table 1 shows lens data of Example 1. In the following data, an exponent for 10 is expressed by E, for example, $2.5 \times 10^{-02}$ is expressed by 2.5E-02.

TABLE 1

Example 1
f = 5.70 mm  fB = 0.42 mm  F = 2.88  2Y = 7.128 mm
ENTP = 0.00 mm  EXTP = −3.89 mm  H1 = 1.85 mm  H2 = −5.29 mm

| Surface No. | R (mm) | D (mm) | Nd | vd | Effective radius (mm) |
|---|---|---|---|---|---|
| 1 (Aperture) | ∞ | 0.00 | | | 0.99 |
| 2* | 2.784 | 1.14 | 1.5318 | 56.0 | 1.06 |
| 3* | −2.998 | 0.08 | | | 1.21 |

TABLE 1-continued

Example 1
f = 5.70 mm fB = 0.42 mm F = 2.88 2Y = 7.128 mm
ENTP = 0.00 mm EXTP = −3.89 mm H1 = 1.85 mm H2 = −5.29 mm

| | | | | | |
|---|---|---|---|---|---|
| 4* | −7.950 | 0.43 | 1.583 | 30.0 | 1.22 |
| 5* | 2.776 | 1.26 | | | 1.24 |
| 6* | 3.909 | 0.74 | 1.583 | 30.0 | 2.30 |
| 7* | 3.506 | 0.66 | | | 2.58 |
| 8* | 1.639 | 0.88 | 1.5318 | 56.0 | 3.07 |
| 9* | 1.561 | 1.00 | | | 3.31 |
| 10 | ∞ | 0.10 | 1.5163 | 64.1 | 3.52 |
| 11 | ∞ | | | | 3.55 |

Aspheric surface coefficient $2^{nd}$ surface

| | |
|---|---|
| K = | 6.08738E−01 |
| A4 = | −1.78366E−02 |
| A6 = | −5.79114E−03 |
| A8 = | −4.77552E−03 |

$3^{rd}$ surface

| | |
|---|---|
| K = | −8.01419E+00 |
| A4 = | −2.48068E−02 |
| A6 = | 5.61210E−03 |
| A8 = | −5.72821E−03 |

$4^{th}$ surface

| | |
|---|---|
| K = | 3.05973E+00 |
| A4 = | −6.31504E−03 |
| A6 = | 3.60684E−02 |
| A8 = | −1.42816E−02 |
| A10 = | 1.91511E−03 |

$5^{th}$ surface

| | |
|---|---|
| K = | 1.59232E+00 |
| A4 = | −3.85594E−02 |
| A6 = | 3.57031E−02 |
| A8 = | −1.37702E−02 |
| A10 = | 3.64593E−03 |
| A12 = | −8.08998E−04 |

$6^{th}$ surface

| | |
|---|---|
| K = | −3.84979E+00 |
| A4 = | −6.79636E−03 |
| A6 = | 1.29538E−03 |
| A8 = | −9.04145E−04 |
| A10 = | 1.15304E−04 |
| A12 = | −2.40400E−06 |

$7^{th}$ surface

| | |
|---|---|
| K = | −3.00000E+01 |
| A4 = | 4.68503E−03 |
| A6 = | −1.16936E−03 |
| A8 = | −3.82900E−04 |
| A10 = | 7.10420E−05 |
| A12 = | −3.56100E−06 |

$8^{th}$ surface

| | |
|---|---|
| K = | −4.64748E+00 |
| A4 = | −2.54381E−02 |
| A6 = | 1.89062E−03 |
| A8 = | 2.72710E−05 |
| A10 = | −3.96300E−06 |
| A12 = | −5.60000E−08 |

$9^{th}$ surface

| | |
|---|---|
| K = | −4.31928E+00 |
| A4 = | −1.93208E−02 |
| A6 = | 1.74600E−03 |
| A8 = | −1.64924E−04 |
| A10 = | 1.41140E−05 |
| A12 = | −4.70000E−07 |

Single lens data

| Lens | Forefront surface | Focal length (mm) |
|---|---|---|
| 1 | 2 | 2.914 |
| 2 | 4 | −3.478 |
| 3 | 6 | −181.290 |
| 4 | 8 | 21.154 |

Figure 2:
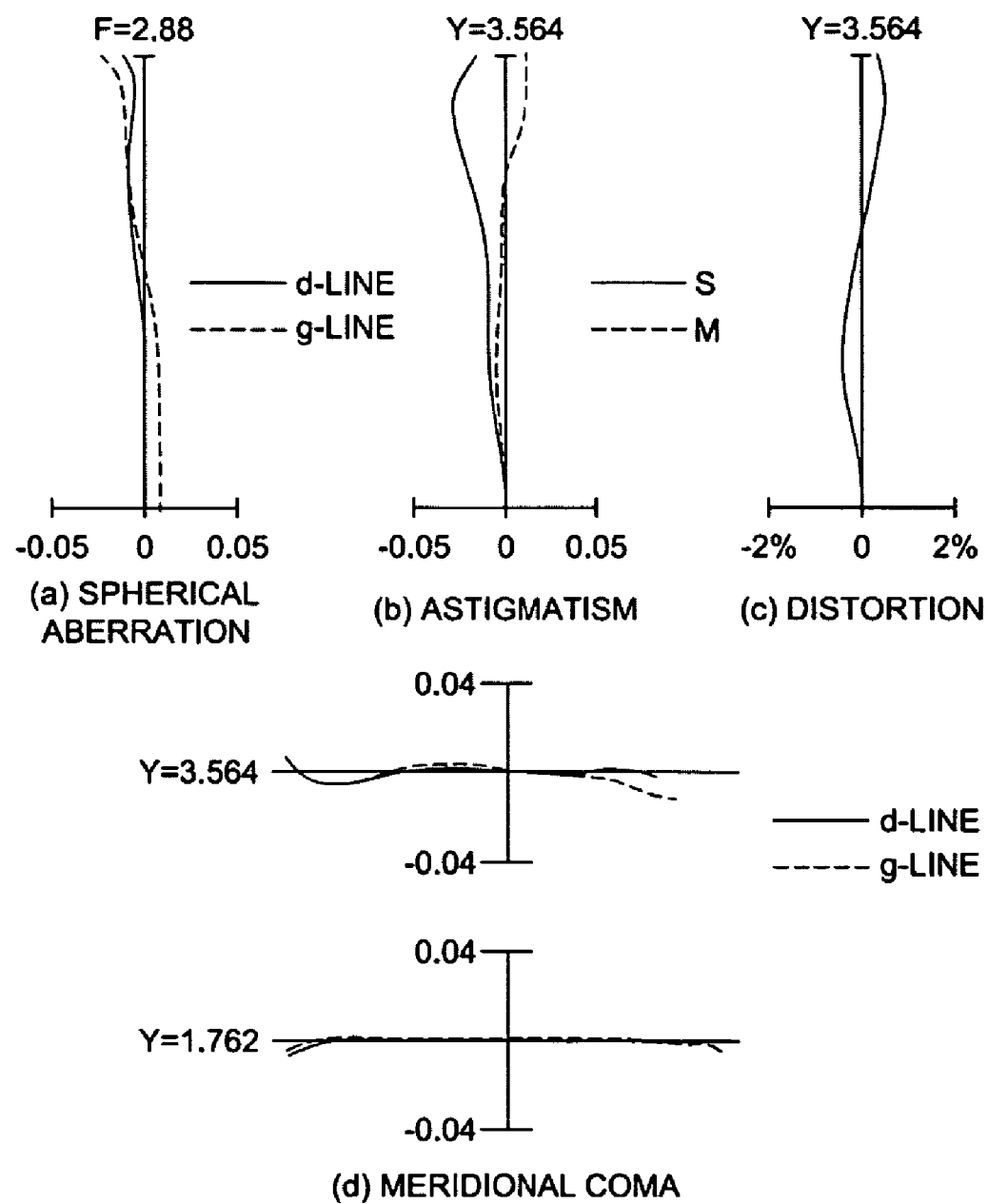
FIG. 2 is an aberration diagram of Example 1.

FIG. 1 is a sectional view of the image pickup lens in Example 1. In the drawing, L1 represents the first lens, L2 represents the second lens, L3 represents the third lens, L4 represents the fourth lens, S represents an aperture stop and I represents an image pickup surface. Further, F represents a parallel plate with which an optical lowpass filter, an infrared blocking filter and a seal glass of a solid state image pickup element are assumed. FIG. 2 is a diagram of aberration of Example 1, including spherical aberration, astigmatism, distortion and meridional coma. In the present Example, all lenses are made of plastic material.

EXAMPLE 2

Table 2 shows lens data of Example 2.

TABLE 2

Example 2
f = 5.81 mm fB = 0.61 mm F = 2.88 2Y = 7.128 mm
ENTP = 0.00 mm EXTP = −3.85 mm H1 = 1.75 mm H2 = −5.19 mm

| Surface No. | R (mm) | D (mm) | Nd | νd | Effective radius (mm) |
|---|---|---|---|---|---|
| 1 (Aperture) | ∞ | 0.00 | | | 0.99 |
| 2* | 3.128 | 1.20 | 1.5163 | 64.1 | 1.08 |
| 3* | −5.824 | 0.17 | | | 1.24 |
| 4* | 4.250 | 0.45 | 1.8052 | 25.4 | 1.31 |
| 5* | 2.052 | 1.13 | | | 1.30 |
| 6* | 4.294 | 0.91 | 1.583 | 30.0 | 2.67 |
| 7* | 3.409 | 0.55 | | | 2.91 |
| 8* | 1.714 | 1.10 | 1.5318 | 56.0 | 3.26 |
| 9* | 1.890 | 0.80 | | | 3.40 |
| 10 | ∞ | 0.10 | 1.5163 | 64.1 | 3.65 |
| 11 | ∞ | | | | 3.66 |

Aspheric surface coefficient $2^{nd}$ surface

| | |
|---|---|
| K = | 4.65493E−01 |
| A4 = | −1.19230E−02 |
| A6 = | −1.86512E−03 |
| A8 = | −1.44092E−03 |

$3^{rd}$ surface

| | |
|---|---|
| K = | −8.08398E+00 |
| A4 = | −1.56712E−02 |
| A6 = | 1.12063E−02 |
| A8 = | −6.06632E−03 |

$4^{th}$ surface

| | |
|---|---|
| K = | −5.16307E+00 |
| A4 = | −3.08024E−02 |
| A6 = | 3.12564E−02 |
| A8 = | −9.25166E−03 |
| A10 = | 3.78190E−04 |

$5^{th}$ surface

| | |
|---|---|
| K = | 6.79296E−01 |
| A4 = | −6.71910E−02 |
| A6 = | 3.00128E−02 |
| A8 = | −1.32055E−02 |

TABLE 2-continued

Example 2
f = 5.81 mm fB = 0.61 mm F = 2.88 2Y = 7.128 mm
ENTP = 0.00 mm EXTP = −3.85 mm H1 = 1.75 mm H2 = −5.19 mm

| | |
|---|---|
| A10 = | 3.90421E−03 |
| A12 = | −1.41382E−03 |
| 6$^{th}$ surface | |
| K = | −1.25503E+00 |
| A4 = | −6.40560E−03 |
| A6 = | 1.68221E−03 |
| A8 = | −6.81655E−04 |
| A10 = | 1.05364E−04 |
| A12 = | −5.30500E−06 |
| 7$^{th}$ surface | |
| K = | −3.00000E+01 |
| A4 = | 2.22417E−03 |
| A6 = | 1.46418E−03 |
| A8 = | −5.80529E−04 |
| A10 = | 7.03150E−05 |
| A12 = | −2.93700E−06 |
| 8$^{th}$ surface | |
| K = | −4.86217E+00 |
| A4 = | −1.61963E−02 |
| A6 = | 4.93882E−04 |
| A8 = | 7.51920E−05 |
| A10 = | −1.97600E−06 |
| A12 = | −1.15000E−07 |
| 9$^{th}$ surface | |
| K = | −4.33973E+00 |
| A4 = | −1.53189E−02 |
| A6 = | 1.48192E−03 |
| A8 = | −2.36119E−04 |
| A10 = | 1.57710E−05 |
| A12 = | −2.36000E−07 |

Single lens data

| Lens | Forefront surface | Focal length (mm) |
|---|---|---|
| 1 | 2 | 4.130 |
| 2 | 4 | −5.417 |
| 3 | 6 | −45.687 |
| 4 | 8 | 10.928 |

Figure 3:
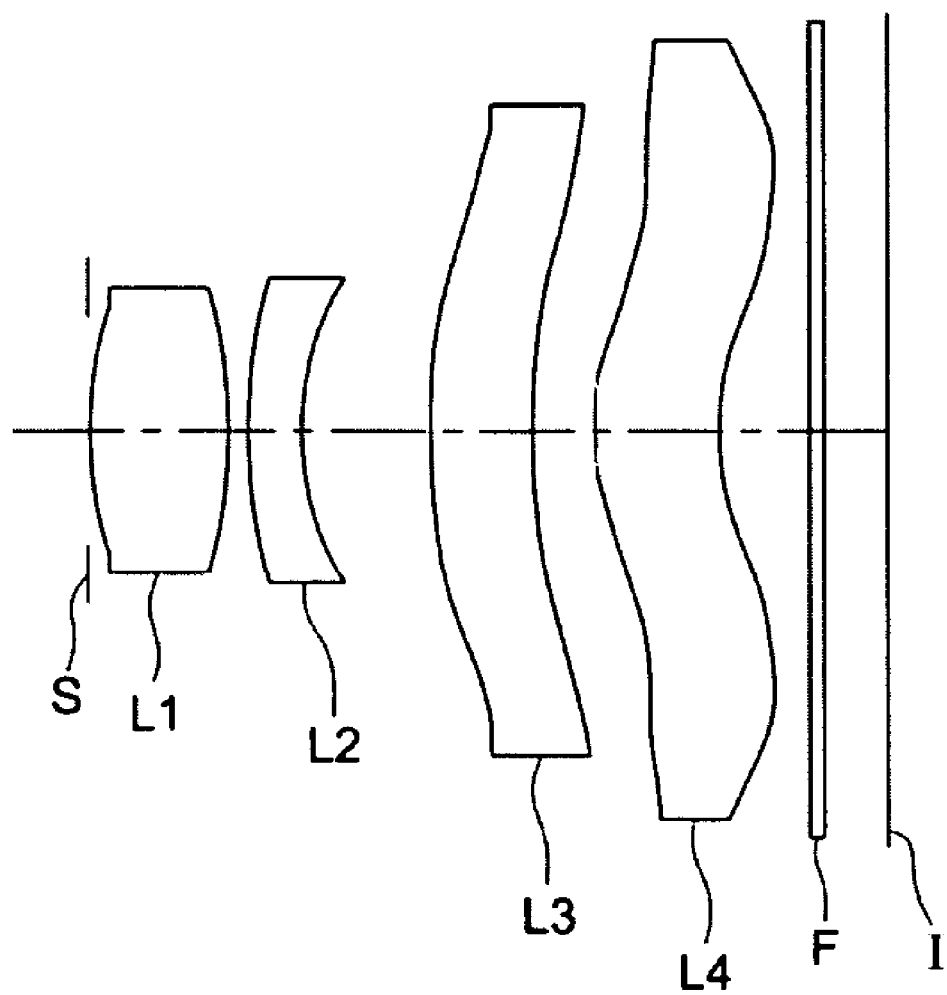
FIG. 3 is a sectional view of a lens in Example 2.
Figure 4:
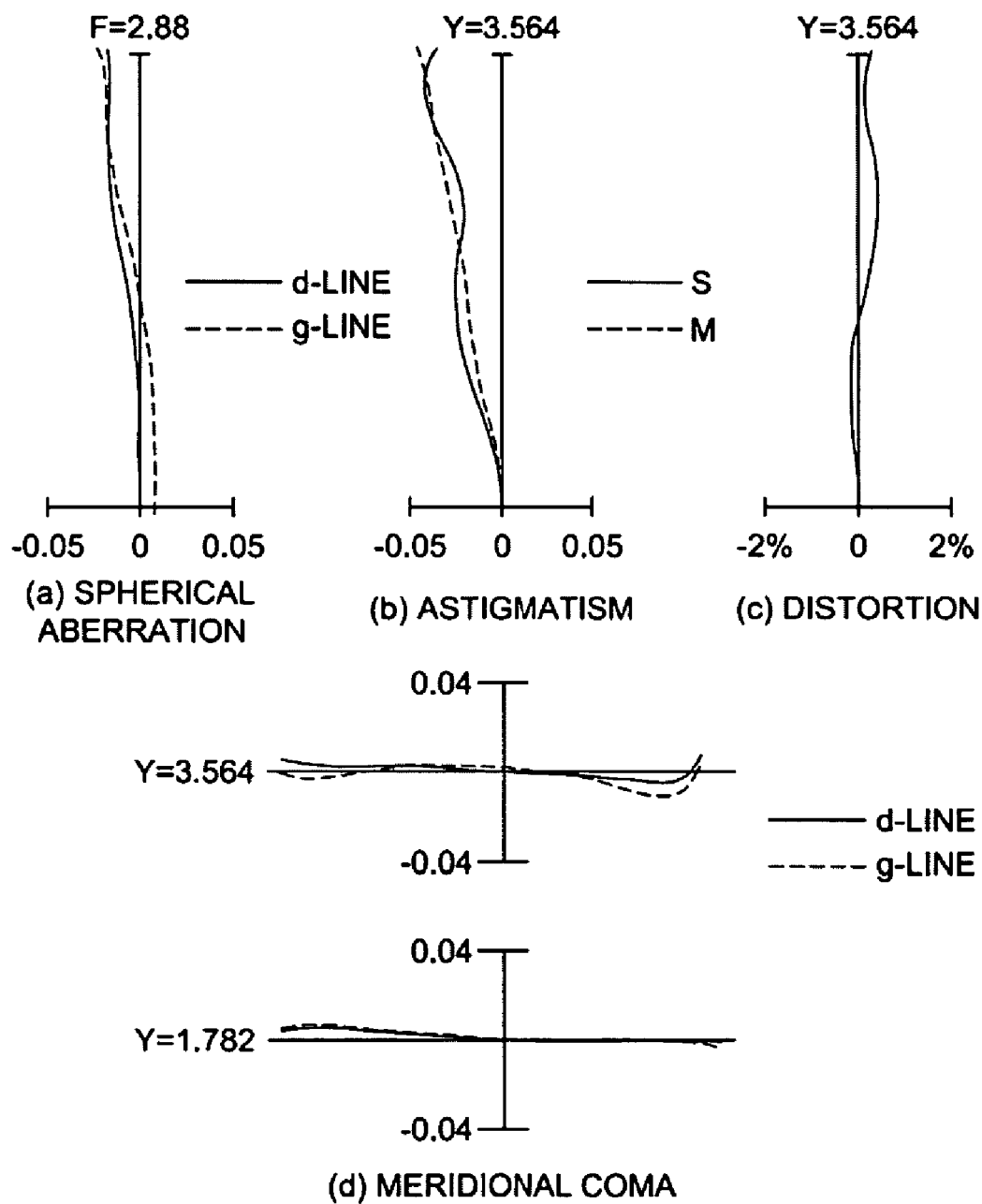
FIG. 4 is an aberration diagram of Example 2.

FIG. 3 is a sectional view of the image pickup lens in Example 2. In the drawing, L1 represents the first lens, L2 represents the second lens, L3 represents the third lens, L4 represents the fourth lens, S represents an aperture stop and I represents an image pickup surface. Further, F represents a parallel plate with which an optical lowpass filter, an infrared blocking filter and a seal glass of a solid state image pickup element are assumed. FIG. 4 is a diagram of aberration in Example 2 including spherical aberration, astigmatism, distortion and meridional coma. In the present Example, each of the first lens and the second lens is a glass mold lens, and each of the third lens and the fourth lens is made of plastic material.

EXAMPLE 3

Table 3 shows lens data of Example 3.

TABLE 3

Example 3
f = 5.57 mm fB = 0.54 mm F = 2.88 2Y = 7.128 mm
ENTP = 0.00 mm EXTP = −3.77 mm H1 = 1.63 mm H2 = −5.03 mm TABLE 3-continued Example 3
f = 5.57 mm fB = 0.54 mm F = 2.88 2Y = 7.128 mm
ENTP = 0.00 mm EXTP = −3.77 mm H1 = 1.63 mm H2 = −5.03 mm

| Surface No. | R (mm) | D (mm) | Nd | vd | Effective radius (mm) |
|---|---|---|---|---|---|
| 1 (Aperture) | ∞ | 0.00 | | | 0.97 |
| 2* | 3.390 | 1.24 | 1.5318 | 56.0 | 1.01 |
| 3* | −2.989 | 0.17 | | | 1.22 |
| 4* | −10.878 | 0.47 | 1.6147 | 25.6 | 1.26 |
| 5* | 3.053 | 1.08 | | | 1.30 |
| 6* | 3.619 | 0.69 | 1.6147 | 25.6 | 2.44 |
| 7* | 4.031 | 0.78 | | | 2.61 |
| 8* | 1.851 | 0.94 | 1.5318 | 56.0 | 2.89 |
| 9* | 1.673 | 0.80 | | | 3.30 |
| 10 | ∞ | 0.10 | 1.5163 | 64.1 | 3.61 |
| 11 | ∞ | | | | 3.63 |

Aspheric surface coefficient

| | |
|---|---|
| 2$^{nd}$ surface | |
| K = | 3.18429E−01 |
| A4 = | −1.90092E−02 |
| A6 = | −5.39922E−03 |
| A8 = | −3.17975E−03 |
| 3$^{rd}$ surface | |
| K = | −4.93029E+00 |
| A4 = | −3.03876E−02 |
| A6 = | 9.08308E−03 |
| A8 = | −5.20785E−03 |
| 4$^{th}$ surface | |
| K = | 2.34530E+01 |
| A4 = | −1.77127E−02 |
| A6 = | 4.01389E−02 |
| A8 = | −1.36954E−02 |
| A10 = | 1.56885E−03 |
| 5$^{th}$ surface | |
| K = | 1.11576E+00 |
| A4 = | −3.72510E−02 |
| A6 = | 3.52832E−02 |
| A8 = | −1.44150E−02 |
| A10 = | 4.59146E−03 |
| A12 = | −8.53552E−04 |
| 6$^{th}$ surface | |
| K = | −3.27157E+00 |
| A4 = | −5.92665E−03 |
| A6 = | 2.12996E−03 |
| A8 = | −7.82401E−04 |
| A10 = | 9.84520E−05 |
| A12 = | −4.12900E−06 |
| 7$^{th}$ surface | |
| K = | −3.00000E+01 |
| A4 = | 3.65544E−03 |
| A6 = | 3.64588E−04 |
| A8 = | −4.98027E−04 |
| A10 = | 7.18960E−05 |
| A12 = | −3.82900E−06 |
| 8$^{th}$ surface | |
| K = | −4.28092E+00 |
| A4 = | −2.78486E−02 |
| A6 = | 1.11491E−03 |
| A8 = | 9.49290E−05 |
| A10 = | 5.47700E−06 |
| A12 = | −1.14900E−06 |
| 9$^{th}$ surface | |
| K = | −3.48250E+00 |
| A4 = | −2.19776E−02 |
| A6 = | 2.26234E−03 |
| A8 = | −2.40437E−04 |
| A10 = | 1.51910E−05 |
| A12 = | −3.62000E−07 |

TABLE 3-continued

Example 3
f = 5.57 mm fB = 0.54 mm F = 2.88 2Y = 7.128 mm
ENTP = 0.00 mm EXTP = −3.77 mm H1 = 1.63 mm H2 = −5.03 mm Single lens data

| Lens | Fore front surface | Focal length (mm) |
|---|---|---|
| 1 | 2 | 3.203 |
| 2 | 4 | −3.829 |
| 3 | 6 | 35.188 |
| 4 | 8 | 39.247 |

Figure 5:
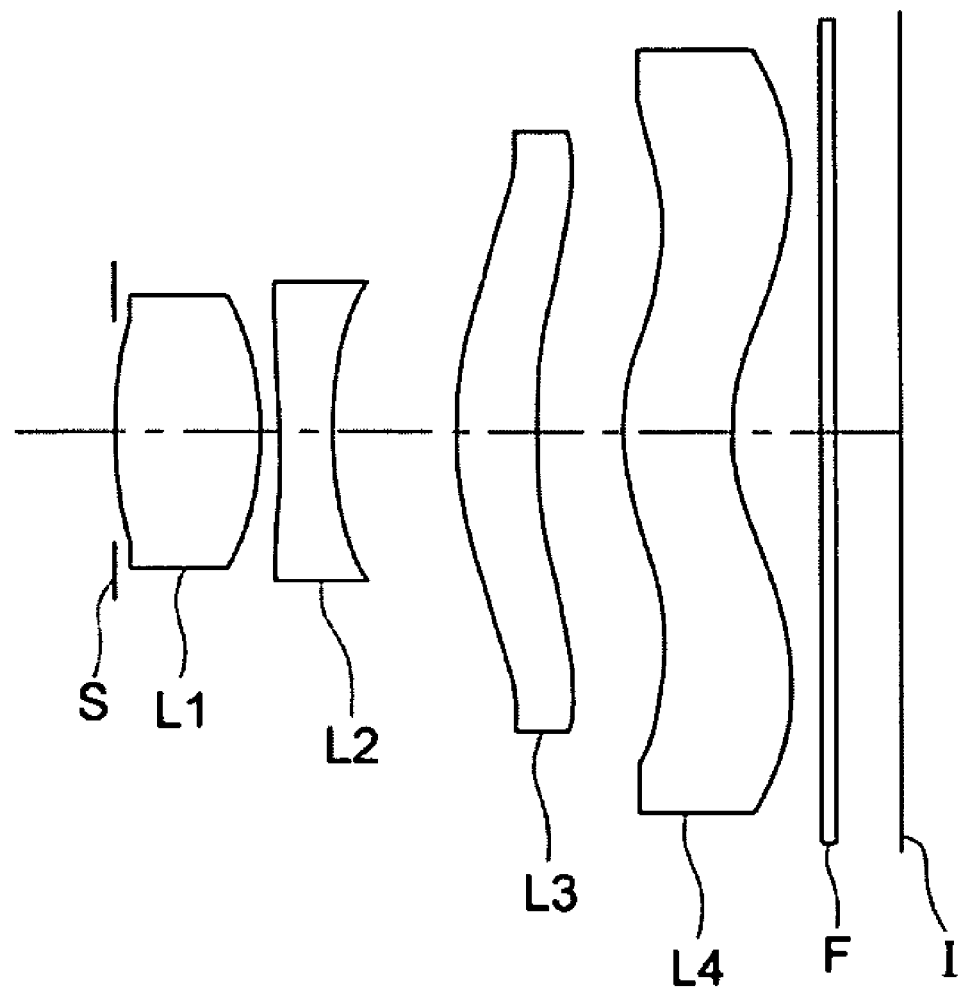
FIG. 5 is a sectional view of a lens in Example 3.
Figure 6:
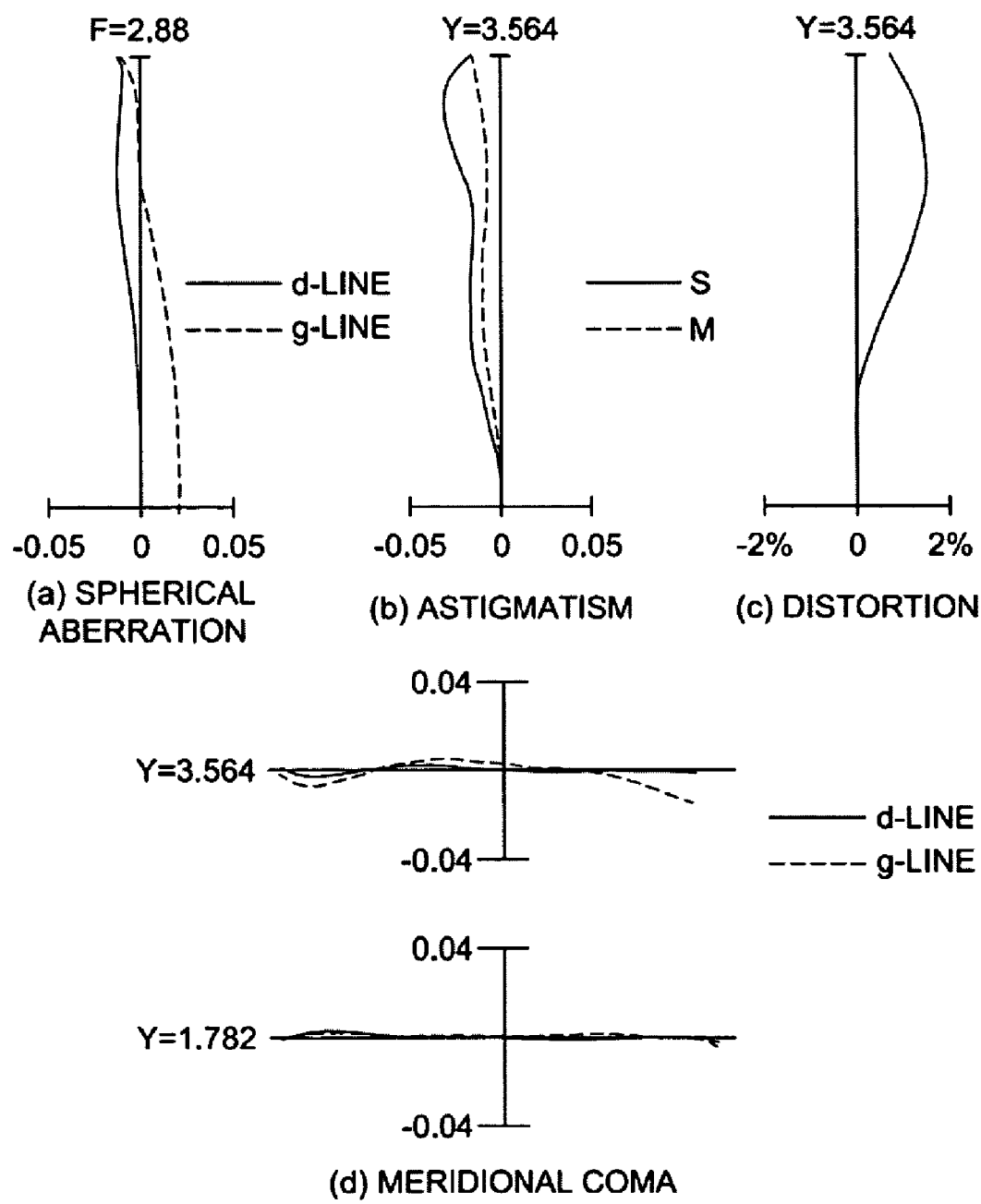
FIG. 6 is an aberration diagram of Example 3.

FIG. 5 is a sectional view of the image pickup lens in Example 3. In the drawing, L1 represents the first lens, L2 represents the second lens, L3 represents the third lens, L4 represents the fourth lens, S represents an aperture stop and I represents an image pickup surface. Further, F represents a parallel plate with which an optical lowpass filter, an infrared blocking filter and a seal glass of a solid state image pickup element are assumed. FIG. 6 is a diagram of aberration of Example 3 including spherical aberration, astigmatism, distortion and meridional coma. In the present Example, all lenses are made of plastic material.

EXAMPLE 4

Table 4 shows lens data of Example 4.

TABLE 4

Example 4
f = 5.72 mm fB = 0.64 mm F = 2.88 2Y = 7.128 mm
ENTP = 0.00 mm EXTP = −3.52 mm H1 = 2.15 mm H2 = −5.08 mm

| Surface No. | R (mm) | D (mm) | Nd | νd | Effective radius (mm) |
|---|---|---|---|---|---|
| 1 (Aperture) | ∞ | 0.00 | | | 0.98 |
| 2* | 3.259 | 1.24 | 1.5891 | 61.2 | 1.02 |
| 3* | −3.074 | 0.10 | | | 1.20 |
| 4* | −19.010 | 0.53 | 1.6889 | 31.2 | 1.22 |
| 5* | 2.617 | 1.02 | | | 1.24 |
| 6* | 3.884 | 0.71 | 1.583 | 30.0 | 2.22 |
| 7* | 3.188 | 0.57 | | | 2.44 |
| 8* | 1.727 | 1.01 | 1.5318 | 56.0 | 2.64 |
| 9* | 1.732 | 0.80 | | | 3.09 |
| 10 | ∞ | 0.10 | 1.5163 | 64.1 | 3.53 |
| 11 | ∞ | | | | 3.55 |

Aspheric surface coefficient $2^{nd}$ surface

K = −8.06011E−02
A4 = −1.69700E−02
A6 = −3.48063E−03
A8 = −4.53912E−03

$3^{rd}$ surface

K = −7.14429E+00
A4 = −2.93260E−02
A6 = 7.92943E−03
A8 = −6.31331E−03

$4^{th}$ surface

K = 3.00000E+01
A4 = −1.54198E−02
A6 = 3.42826E−02
A8 = −1.38547E−02
A10 = 1.51018E−03

$5^{th}$ surface

TABLE 4-continued

Example 4
f = 5.72 mm fB = 0.64 mm F = 2.88 2Y = 7.128 mm
ENTP = 0.00 mm EXTP = −3.52 mm H1 = 2.15 mm H2 = −5.08 mm K = 1.00857E+00
A4 = −4.30610E−02
A6 = 3.62011E−02
A8 = −1.63055E−02
A10 = 5.41470E−03
A12 = −1.19333E−03

$6^{th}$ surface

K = −7.90859E+00
A4 = −3.39286E−03
A6 = 1.68555E−03
A8 = −8.31128E−04
A10 = 8.46200E−05
A12 = 7.23000E−07

$7^{th}$ surface

K = −3.00000E+01
A4 = −5.46682E−03
A6 = 2.08947E−03
A8 = −5.90693E−04
A10 = 3.80690E−05
A12 = 7.10000E−07

$8^{th}$ surface

K = −5.66586E+00
A4 = −4.06529E−02
A6 = 3.27737E−03
A8 = 4.55400E−06
A10 = −6.84000E−06
A12 = 1.00000E−08

$9^{th}$ surface

K = −5.27519E+00
A4 = −2.74649E−02
A6 = 2.73935E−03
A8 = −2.53683E−04
A10 = 1.39410E−05
A12 = −2.90000E−07

Single lens data

| Lens | Forefront surface | Focal length (mm) |
|---|---|---|
| 1 | 2 | 2.895 |
| 2 | 4 | −3.306 |
| 3 | 6 | −48.858 |
| 4 | 8 | 15.761 |

Figure 7:
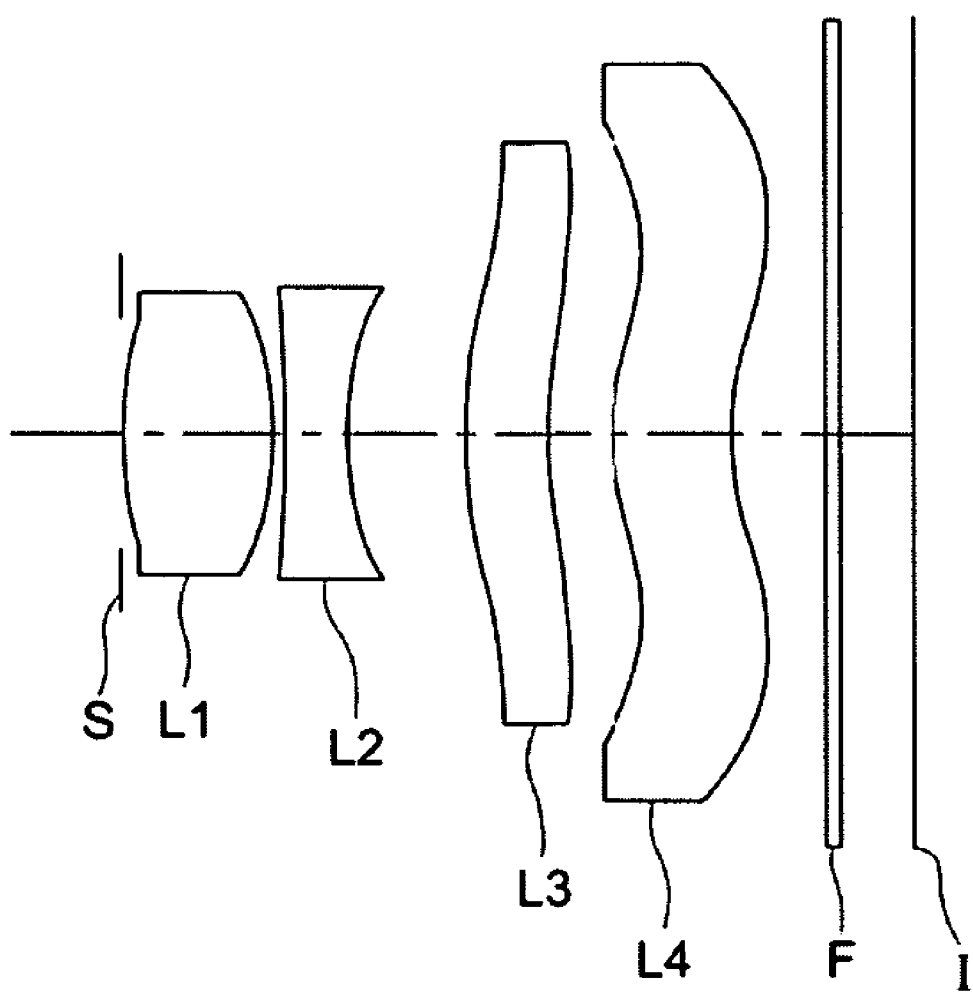
FIG. 7 is a sectional view of a lens in Example 4.
Figure 8:
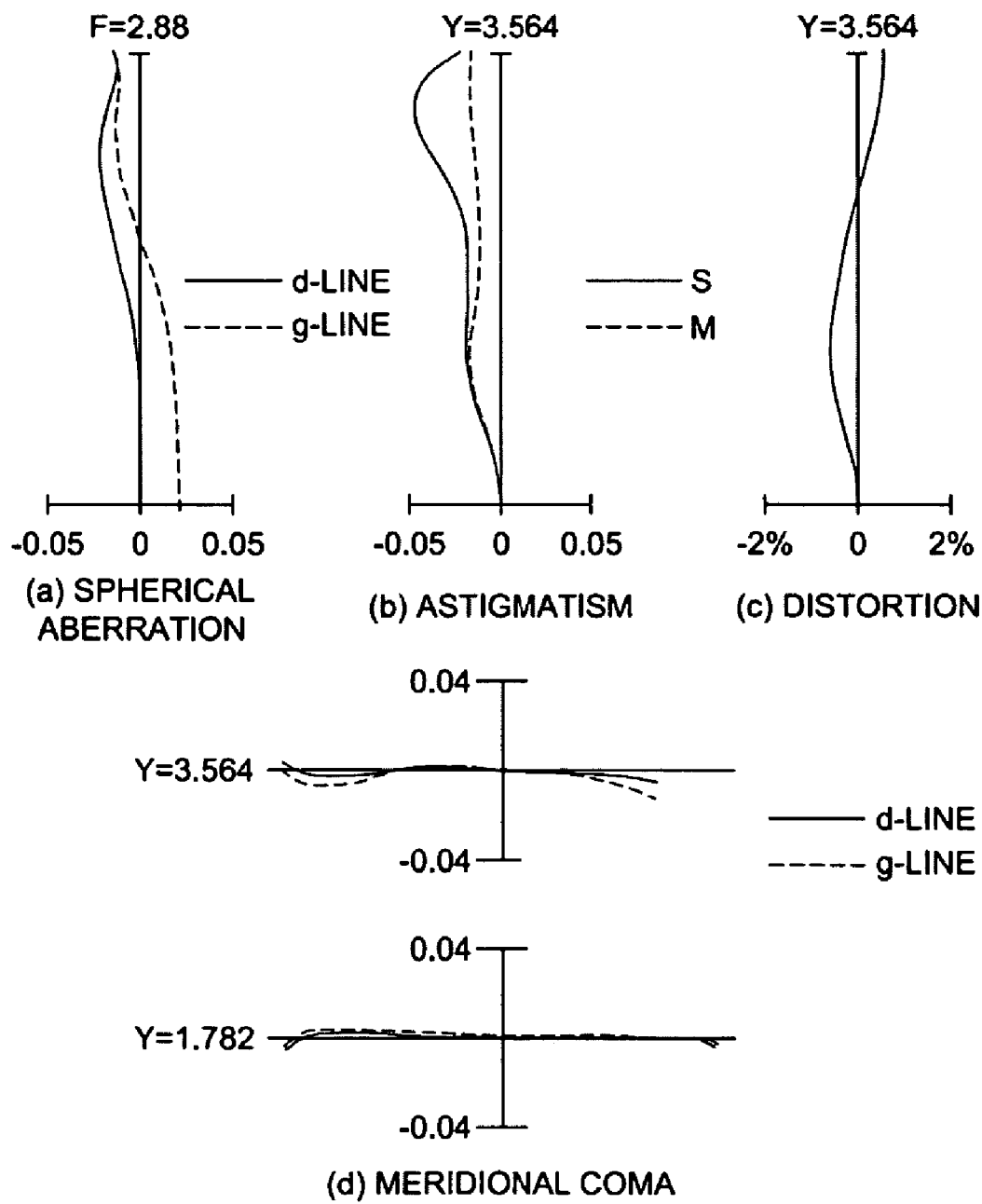
FIG. 8 is an aberration diagram of Example 4.

FIG. 7 is a sectional view of the image pickup lens in Example 4. In the drawing, L1 represents the first lens, L2 represents the second lens, L3 represents the third lens, L4 represents the fourth lens, S represents an aperture stop and I represents an image pickup surface. Further, F represents a parallel plate with which an optical lowpass filter, an infrared blocking filter and a seal glass of a solid state image pickup element are assumed. FIG. 8 is a diagram of aberration in Example 4 including spherical aberration, astigmatism, distortion and meridional coma. In the present Example, each of the first lens and the second lens is a glass mold lens, and each of the third lens and the fourth lens is made of plastic material.

EXAMPLE 5

Table 5 shows lens data of Example 5.

TABLE 5

Example 5
f = 5.63 mm fB = 0.57 mm F = 2.88 2Y = 7.128 mm
ENTP = 0.00 mm EXTP = 3.38 mm H1 = 2.37 mm H2 = −5.05 mm

| Surface No. | R (mm) | D (mm) | Nd | vd | Effective radius (mm) |
|---|---|---|---|---|---|
| 1 (Aperture) | ∞ | 0.00 | | | 0.98 |
| 2* | 3.071 | 1.22 | 1.56 | 45.0 | 1.03 |
| 3* | −2.544 | 0.05 | | | 1.20 |
| 4* | −7.137 | 0.49 | 1.6147 | 25.6 | 1.20 |
| 5* | 2.888 | 1.32 | | | 1.24 |
| 6* | 5.000 | 0.65 | 1.6147 | 25.6 | 2.00 |
| 7* | 3.795 | 0.48 | | | 2.38 |
| 8* | 2.090 | 1.17 | 1.56 | 45.0 | 2.77 |
| 9* | 1.957 | 0.66 | | | 3.33 |
| 10 | ∞ | 0.10 | 1.5163 | 64.1 | 3.57 |
| 11 | ∞ | | | | 3.59 |

Aspheric surface coefficient $2^{nd}$ surface

K = 8.40095E−01
A4 = −1.97124E−02
A6 = −5.83880E−03
A8 = −6.24136E−03

$3^{rd}$ surface

K = −4.49614E+00
A4 = −3.23763E−02
A6 = 1.04127E−02
A8 = −7.06161E−03

$4^{th}$ surface

K = 2.25019E+01
A4 = −2.59783E−02
A6 = 5.34475E−02
A8 = −2.01046E−02
A10 = 3.98863E−03

$5^{th}$ surface

K = 6.33226E−01
A4 = −4.75293E−02
A6 = 4.21668E−02
A8 = −1.73544E−02
A10 = 5.63640E−03
A12 = −9.66313E−04

$6^{th}$ surface

K = 1.72533E−01
A4 = −8.62754E−03
A6 = −2.39752E−03
A8 = −3.96993E−04
A10 = 1.85766E−04
A12 = −5.30740E−05

$7^{th}$ surface

K = −3.00000E+01
A4 = −5.19604E−03
A6 = 7.27630E−05
A8 = −6.12810E−04
A10 = 7.21960E−05
A12 = −5.52200E−06

$8^{th}$ surface

K = −6.46624E+00
A4 = −3.69522E−02
A6 = 2.31180E−03
A8 = 1.52002E−04
A10 = −3.51900E−06
A12 = −1.17600E−06

$9^{th}$ surface

K = −5.06495E+00
A4 = −2.20953E−02
A6 = 2.18748E−03
A8 = −3.04762E−04
A10 = 3.11830E−05
A12 = −1.22600E−06

Single lens data

| Lens | Forefront surface | Focal length (mm) |
|---|---|---|
| 1 | 2 | 2.685 |
| 2 | 4 | −3.284 |
| 3 | 6 | −32.177 |
| 4 | 8 | 25.242 |

Figure 9:
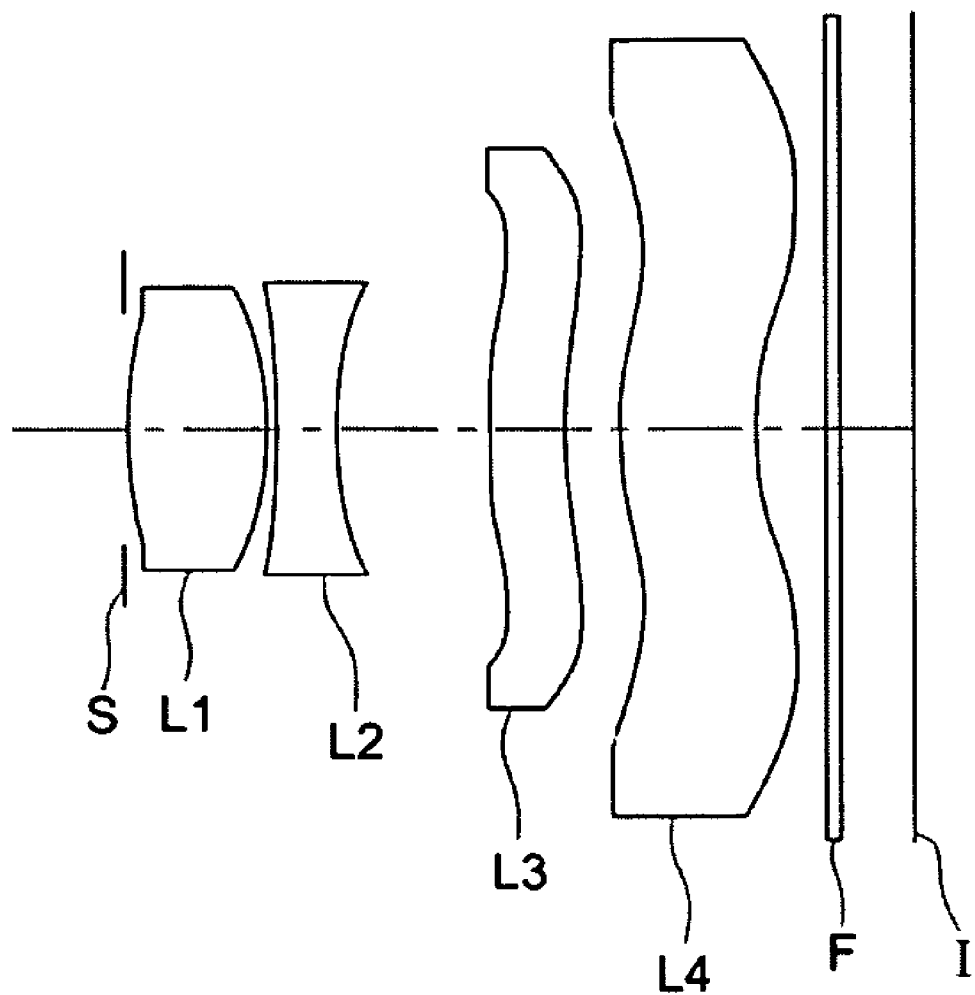
FIG. 9 is a sectional view of a lens in Example 5.
Figure 10:
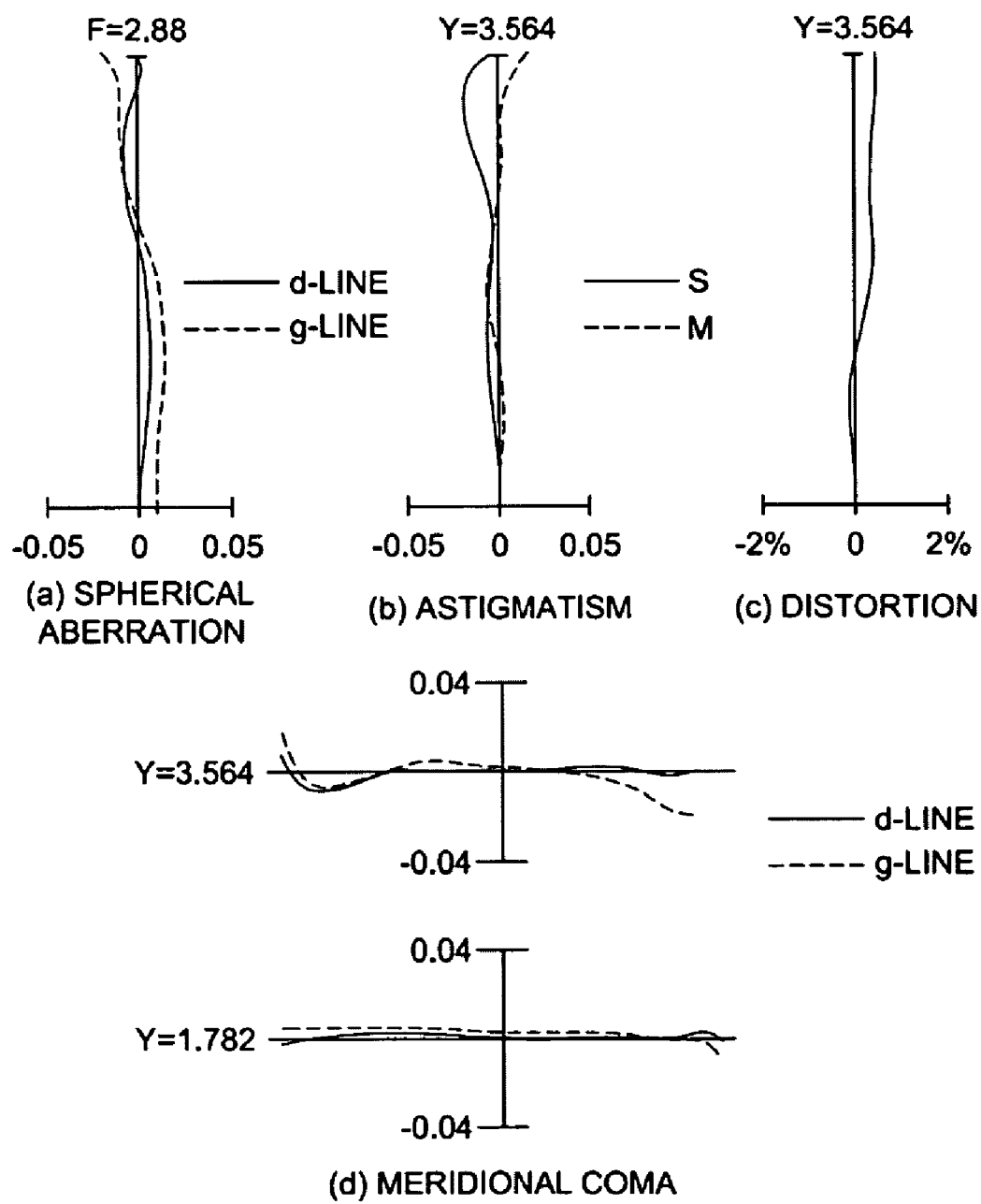
FIG. 10 is an aberration diagram of Example 5.

FIG. 9 is a sectional view of the image pickup lens in Example 5. In the drawing, L1 represents the first lens, L2 represents the second lens, L3 represents the third lens, L4 represents the fourth lens, S represents an aperture stop and I represents an image pickup surface. Further, F represents a parallel plate with which an optical lowpass filter, an infrared blocking filter and a seal glass of a solid state image pickup element are assumed. FIG. 10 is a diagram of aberration in Example 5 including spherical aberration, astigmatism, distortion and meridional coma. In the present Example, all lenses are made of plastic material.

EXAMPLE 6

Table 6 shows lens data of Example 6.

TABLE 6

Example 6
f = 5.78 mm fB = 0.41 mm F = 2.88 2Y = 7.128 mm
ENTP = 0.00 mm EXTP = −3.60 mm H1 = 2.58 mm H2 = −5.38 mm

| Surface No. | R (mm) | D (mm) | Nd | vd | Effective radius (mm) |
|---|---|---|---|---|---|
| 1 (Aperture) | ∞ | 0.00 | | | 1.00 |
| 2* | 3.593 | 1.40 | 1.5318 | 56.0 | 1.04 |
| 3* | −2.732 | 0.22 | | | 1.27 |
| 4* | −5.977 | 0.55 | 1.6147 | 25.6 | 1.30 |
| 5* | 3.337 | 0.71 | | | 1.35 |
| 6* | 3.072 | 0.68 | 1.6147 | 25.6 | 2.06 |
| 7* | 5.148 | 1.07 | | | 2.19 |
| 8* | 2.977 | 0.97 | 1.5318 | 56.0 | 2.31 |
| 9* | 1.986 | 0.80 | | | 3.02 |
| 10 | ∞ | 0.10 | 1.5163 | 64.1 | 3.54 |
| 11 | ∞ | | | | 3.56 |

Aspheric surface coefficient $2^{nd}$ surface

K = 5.04986E−01
A4 = −1.82428E−02
A6 = −4.70154E−03
A8 = −2.69071E−03

$3^{rd}$ surface

K = −4.64024E+00
A4 = −3.27464E−02
A6 = 8.81743E−03
A8 = −3.99579E−03

$4^{th}$ surface

K = 1.22431E+01
A4 = −1.19046E−02
A6 = 4.09868E−02
A8 = −1.39908E−02
A10 = 2.20502E−03

$5^{th}$ surface

K = 4.93645E−01
A4 = −4.52343E−02
A6 = 3.88576E−02
A8 = −1.46950E−02
A10 = 4.18316E−03
A12 = −6.00899E−04

$6^{th}$ surface

TABLE 6-continued

Example 6
f = 5.78 mm fB = 0.41 mm F = 2.88 2Y = 7.128 mm
ENTP = 0.00 mm EXTP = −3.60 mm H1 = 2.58 mm H2 = −5.38 mm

| | |
|---|---|
| K = | −3.36018E+00 |
| A4 = | −6.74829E−03 |
| A6 = | 2.25850E−03 |
| A8 = | −8.53340E−04 |
| A10 = | 8.04900E−05 |
| A12 = | 1.12300E−06 |

$7^{th}$ surface

| | |
|---|---|
| K = | −3.00000E+01 |
| A4 = | 7.23468E−03 |
| A6 = | −1.95930E−04 |
| A8 = | −6.57004E−04 |
| A10 = | 7.48160E−05 |
| A12 = | −1.73500E−06 |

$8^{th}$ surface

| | |
|---|---|
| K = | −8.95344E+00 |
| A4 = | −4.42224E−02 |
| A6 = | 1.64693E−03 |
| A8 = | 3.68129E−04 |
| A10 = | −1.22820E−05 |
| A12 = | −1.41770E−05 |

$9^{th}$ surface

| | |
|---|---|
| K = | −4.95017E+00 |
| A4 = | −2.75856E−02 |
| A6 = | 2.53634E−03 |
| A8 = | −2.86738E−04 |
| A10 = | 2.08770E−05 |
| A12 = | −1.15300E−06 |

Single lens data

| Lens | Forefront surface | Focal length (mm) |
|---|---|---|
| 1 | 2 | 3.161 |
| 2 | 4 | −3.407 |
| 3 | 6 | 11.022 |
| 4 | 8 | −17.011 |

Figure 11:
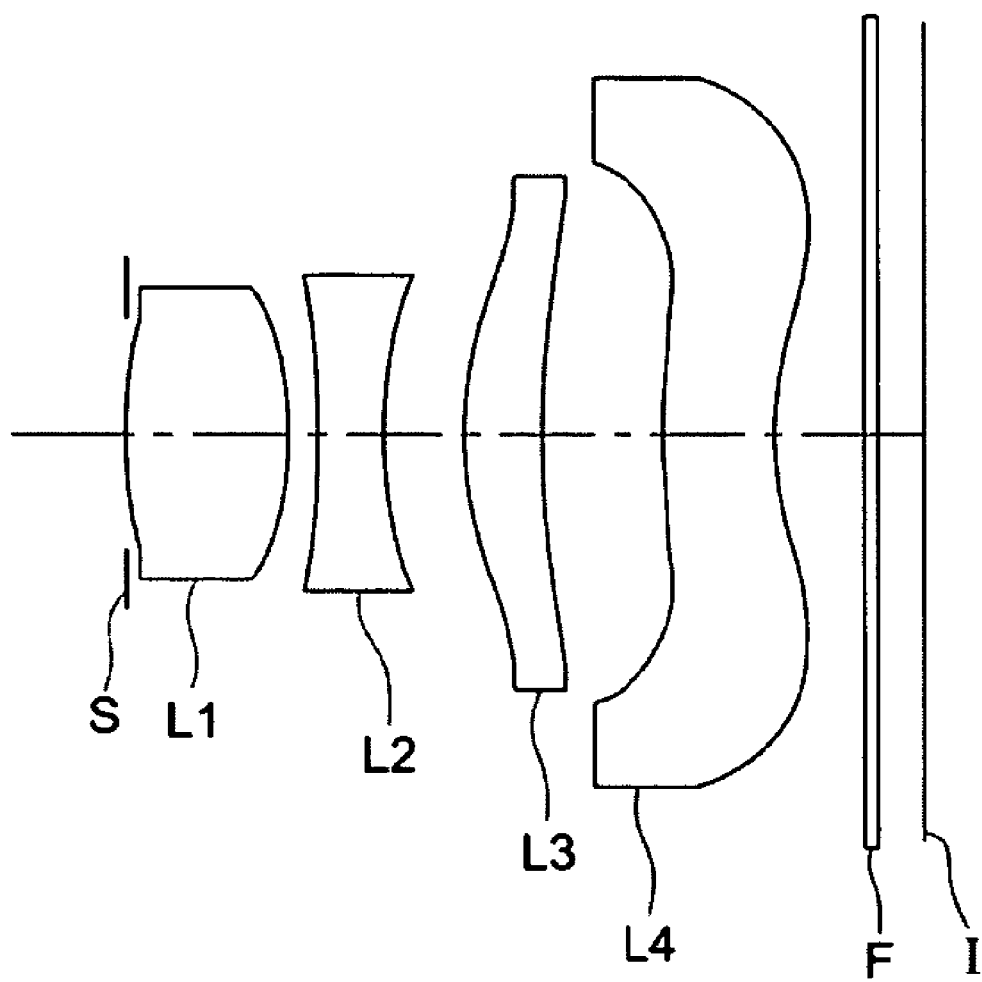
FIG. 11 is a sectional view of a lens in Example 6.
Figure 12:
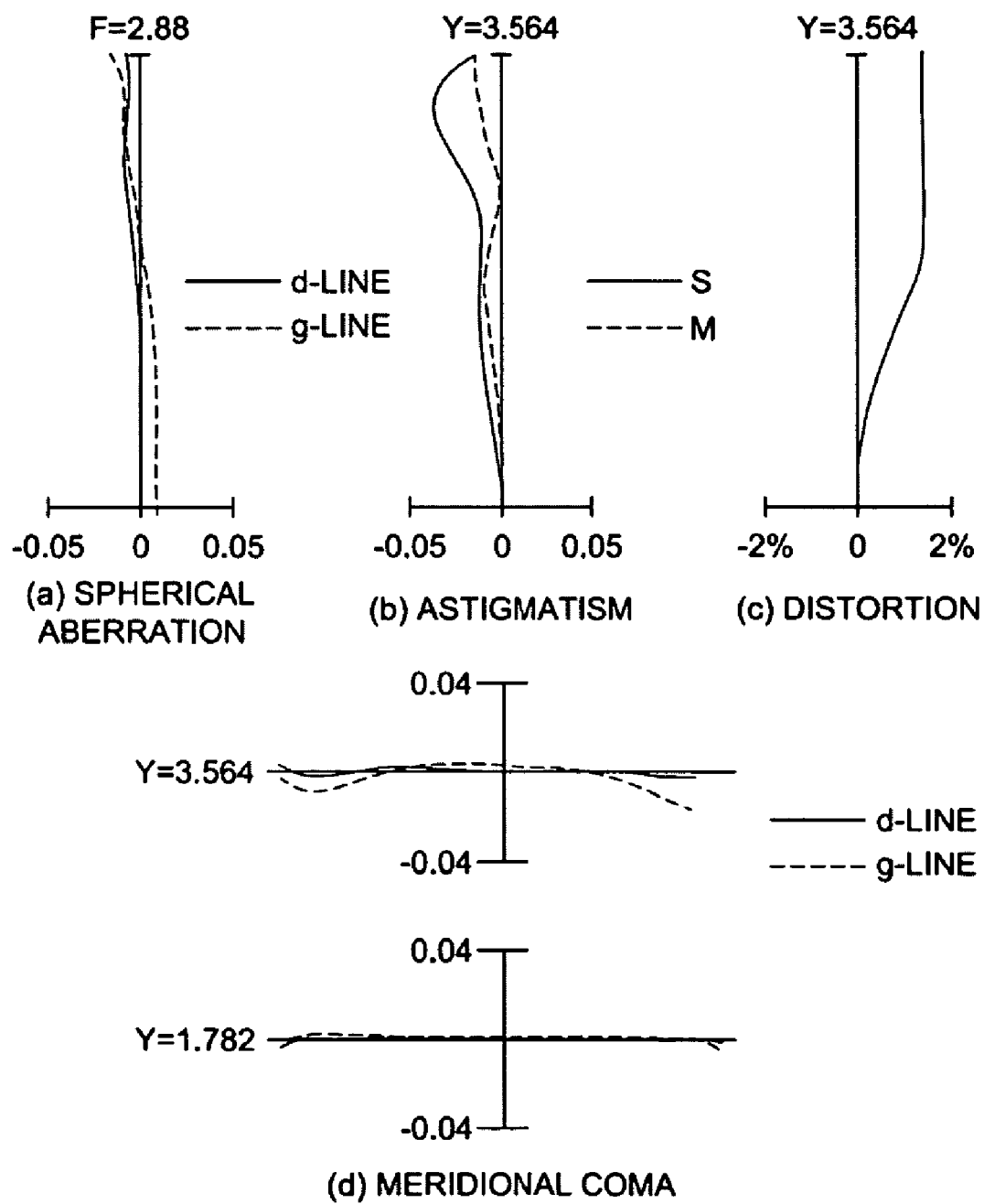
FIG. 12 is an aberration diagram of Example 6.

FIG. 11 is a sectional view of the image pickup lens in Example 6. In the drawing, L1 represents the first lens, L2 represents the second lens, L3 represents the third lens, L4 represents the fourth lens, S represents an aperture stop and I represents an image pickup surface. Further, F represents a parallel plate with which an optical lowpass filter, an infrared blocking filter and a seal glass of a solid state image pickup element are assumed. FIG. 12 is a diagram of aberration in Example 6 including spherical aberration, astigmatism, distortion and meridional coma. In the present Example, all lenses are made of plastic material.

EXAMPLE 7

Table 7 shows lens data of Example 7.

TABLE 7

Example 7
f = 5.817 mm fB = 0.25 mm F = 2.88 2Y = 7.128 mm
ENTP = 0.00 mm EXTP = −4.2317 mm H1 = 1.72 mm H2 = −5.561 mm

| Surface No. | R (mm) | D (mm) | Nd | vd | Effective radius (mm) |
|---|---|---|---|---|---|
| 1 (Aperture) | ∞ | 0.00 | | | 1.01 |
| 2* | 2.430 | 0.84 | 1.53180 | 56.0 | 1.11 |
| 3* | −6.047 | 0.05 | | | 1.19 |

TABLE 7-continued

Example 7
f = 5.817 mm fB = 0.25 mm F = 2.88 2Y = 7.128 mm
ENTP = 0.00 mm EXTP = −4.2317 mm H1 = 1.72 mm H2 = −5.561 mm

| | | | | | |
|---|---|---|---|---|---|
| 4* | 6.279 | 0.40 | 1.58300 | 30.0 | 1.20 |
| 5* | 1.802 | 1.63 | | | 1.19 |
| 6* | 4.781 | 0.92 | 1.58300 | 30.0 | 2.44 |
| 7* | 3.087 | 0.47 | | | 2.86 |
| 8* | 1.824 | 1.14 | 1.53180 | 56.0 | 3.48 |
| 9* | 2.204 | 1.00 | | | 3.48 |
| 10 | ∞ | 0.10 | 1.51630 | 64.1 | 3.63 |
| 11 | ∞ | 0.25 | | | 3.64 |

Aspheric surface coefficient $2^{nd}$ surface

| | |
|---|---|
| K = | 4.03625E−01 |
| A4 = | −1.32522E−02 |
| A6 = | −2.48146E−03 |
| A8 = | −6.85541E−03 |

$3^{rd}$ surface

| | |
|---|---|
| K = | −2.96314E+01 |
| A4 = | −1.65891E−02 |
| A6 = | 1.08492E−03 |
| A8 = | −6.18565E−03 |

$4^{th}$ surface

| | |
|---|---|
| K = | −3.00000E+01 |
| A4 = | −3.25199E−02 |
| A6 = | 3.13563E−02 |
| A8 = | −1.03164E−02 |
| A10 = | 1.29181E−03 |

$5^{th}$ surface

| | |
|---|---|
| K = | 4.88050E−01 |
| A4 = | −7.98554E−02 |
| A6 = | 3.82313E−02 |
| A8 = | −1.64131E−02 |
| A10 = | 4.56374E−03 |
| A12 = | −2.22199E−03 |

$6^{th}$ surface

| | |
|---|---|
| K = | −1.57571E+00 |
| A4 = | −7.84038E−03 |
| A6 = | 1.44951E−03 |
| A8 = | −7.68916E−04 |
| A10 = | 1.06609E−04 |
| A12 = | −4.15000E−06 |

$7^{th}$ surface

| | |
|---|---|
| K = | −2.28808E+01 |
| A4 = | 9.61994E−04 |
| A6 = | 8.06526E−04 |
| A8 = | −5.22517E−04 |
| A10 = | 6.90790E−05 |
| A12 = | −3.04000E−06 |

$8^{th}$ surface

| | |
|---|---|
| K = | −5.32726E+00 |
| A4 = | −1.54789E−02 |
| A6 = | 1.17813E−03 |
| A8 = | 2.35210E−05 |
| A10 = | −4.02900E−06 |
| A12 = | 1.03000E−07 |

$9^{th}$ surface

| | |
|---|---|
| K = | −4.50315E+00 |
| A4 = | −1.58654E−02 |
| A6 = | 1.63631E−03 |
| A8 = | −2.04459E−04 |
| A10 = | 1.56300E−05 |
| A12 = | −3.68000E−07 |

Single lens data

| Lens | Forefront surface | Focal length (mm) |
|---|---|---|

TABLE 7-continued

Example 7
f = 5.817 mm fB = 0.25 mm F = 2.88 2Y = 7.128 mm
ENTP = 0.00 mm EXTP = −4.2317 mm H1 = 1.72 mm H2 = −5.561 mm

| 1 | 2 | 3.375 |
| 2 | 4 | −4.481 |
| 3 | 6 | −18.669 |
| 4 | 8 | 9.750 |

Figure 13:
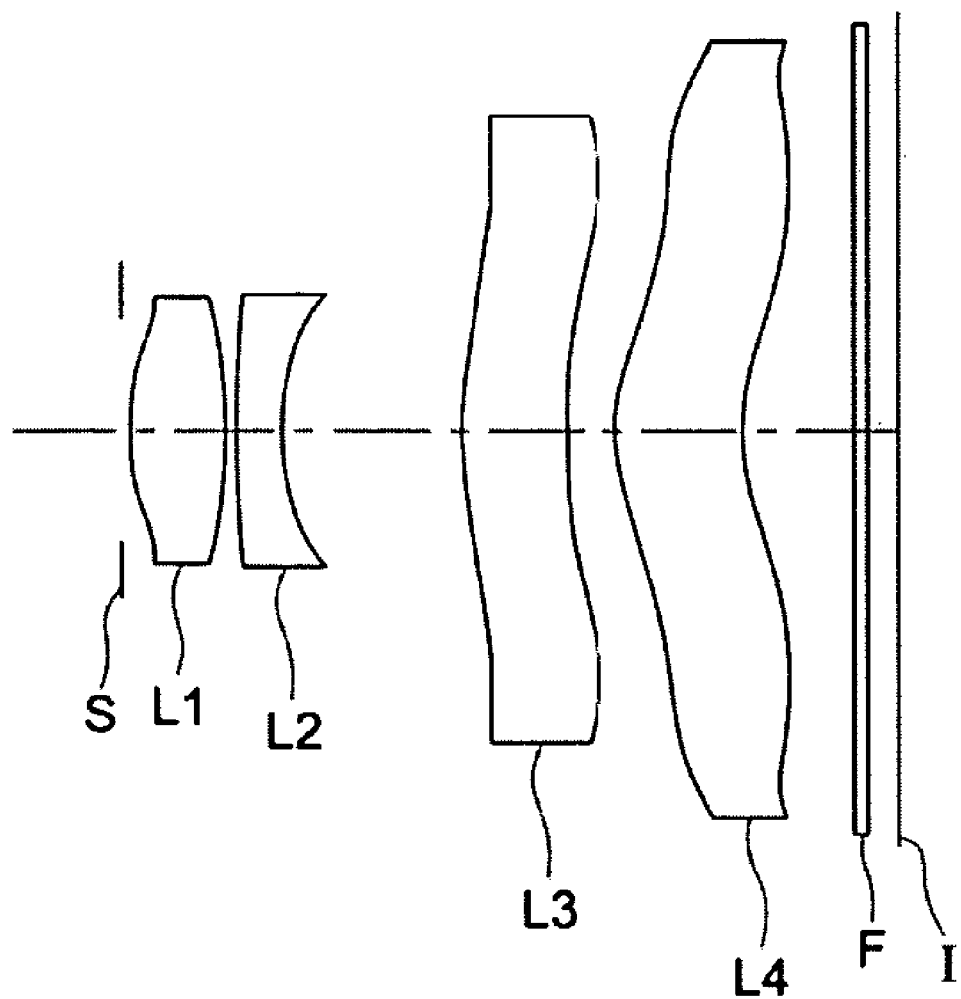
FIG. 13 is a sectional view of a lens in Example 7.
Figure 14:
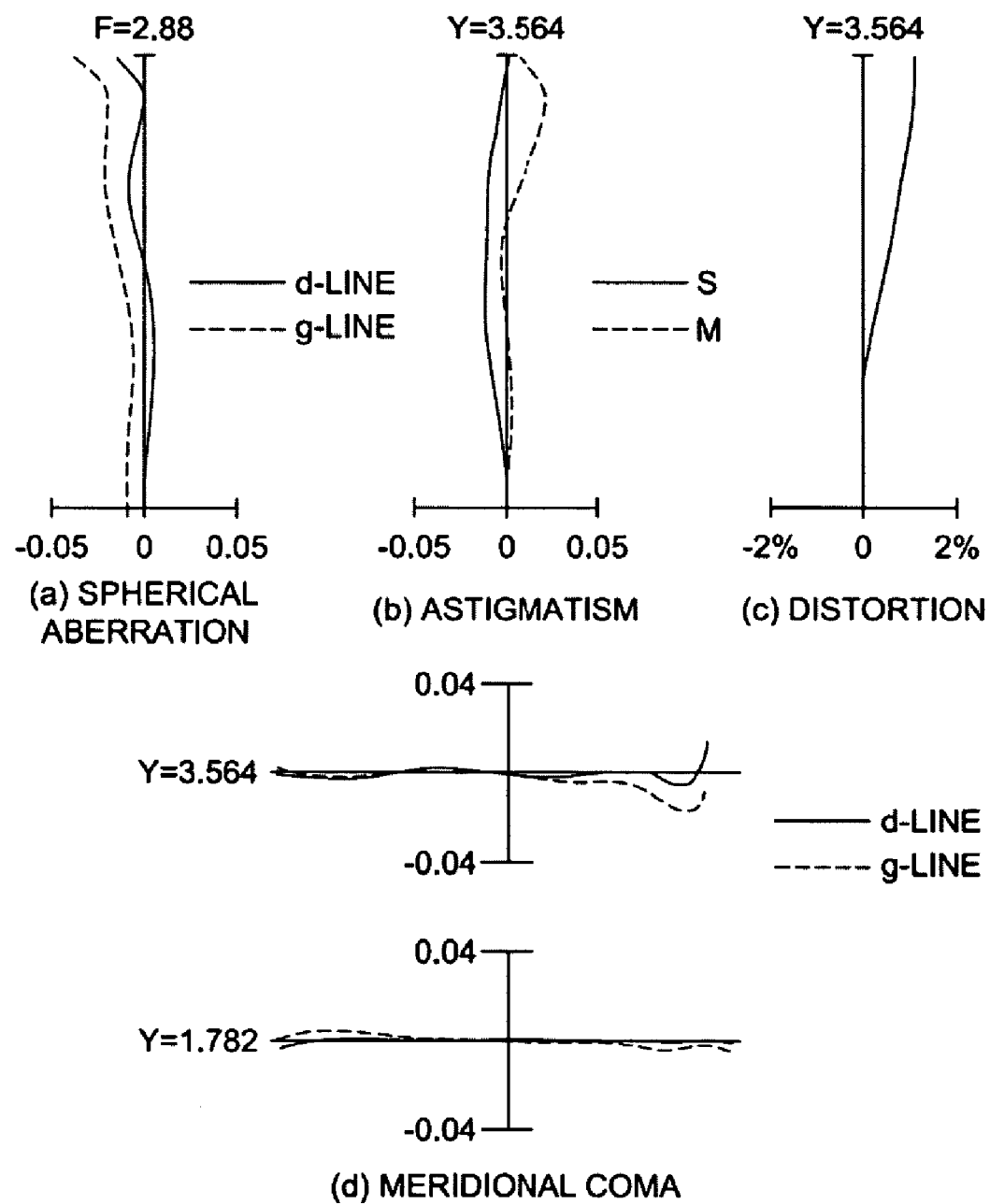
FIG. 14 is an aberration diagram of Example 7.

FIG. 13 is a sectional view of the image pickup lens in Example 7. In the drawing, L1 represents the first lens, L2 represents the second lens, L3 represents the third lens, L4 represents the fourth lens, S represents an aperture stop and I represents an image pickup surface. Further, F represents a parallel plate with which an optical lowpass filter, an infrared blocking filter and a seal glass of a solid state image pickup element are assumed. FIG. 14 is a diagram of aberration in Example 7 including spherical aberration, astigmatism, distortion and meridional coma. In the present Example, all lenses are made of plastic material.

EXAMPLE 8

Table 8 shows lens data of Example 8.

TABLE 8

Example 8
f = 5.842 mm fB = 0.7101 mm F = 2.88 2Y = 7.128 mm
ENTP = 0.00 mm EXTP = −3.7397 mm H1 = −1.82 mm
H2 = −5.128 mm

| Surface No. | R (mm) | D (mm) | Nd | vd | Effective radius (mm) |
|---|---|---|---|---|---|
| 1 (Aperture) | ∞ | 0.00 | | | 0.99 |
| 2* | 3.781 | 1.40 | 1.53050 | 55.7 | 1.05 |
| 3* | −2.958 | 0.30 | | | 1.28 |
| 4* | −5.603 | 0.44 | 1.63200 | 23.4 | 1.33 |
| 5* | 3.902 | 0.75 | | | 1.37 |
| 6* | 2.978 | 0.72 | 1.63200 | 23.4 | 2.19 |
| 7* | 4.997 | 0.98 | | | 2.25 |
| 8* | 2.369 | 0.80 | 1.53050 | 55.7 | 2.41 |
| 9* | 1.832 | 0.80 | | | 2.96 |
| 10 | ∞ | 0.10 | 1.51630 | 64.1 | 3.39 |
| 11 | ∞ | 0.71 | | | 3.41 |

Aspheric surface coefficient $2^{nd}$ surface

K = 0.53288E+00
A4 = −0.18069E−01
A6 = −0.49616E−02
A8 = −0.17656E−02

$3^{rd}$ surface

K = −0.53138E+01
A4 = −0.34073E−01
A6 = 0.85916E−02
A8 = −0.29660E−02

$4^{th}$ surface

K = 0.10081E+02
A4 = −0.68150E−02
A6 = 0.42222E−01
A8 = −0.13918E−01
A10 = 0.21307E−02

$5^{th}$ surface

K = 0.15342E+01
A4 = −0.41071E−01
A6 = 0.40640E−01

TABLE 8-continued

Example 8
f = 5.842 mm fB = 0.7101 mm F = 2.88 2Y = 7.128 mm
ENTP = 0.00 mm EXTP = −3.7397 mm H1 = −1.82 mm
H2 = −5.128 mm

A8 = −0.15348E−01
A10 = 0.41368E−02
A12 = −0.54236E−03

$6^{th}$ surface

K = −0.45664E+01
A4 = −0.60623E−02
A6 = 0.23874E−02
A8 = −0.74945E−03
A10 = 0.11809E−03
A12 = −0.48430E−05

$7^{th}$ surface

K = −0.29079E+02
A4 = −0.22034E−02
A6 = 0.10584E−02
A8 = −0.42759E−03
A10 = 0.66074E−04
A12 = −0.39000E−06

$8^{th}$ surface

K = −0.54077E+01
A4 = −0.52344E−01
A6 = 0.49490E−03
A8 = 0.45722E−03
A10 = 0.17745E−04
A12 = −0.27180E−05

$9^{th}$ surface

K = −0.38618E+01
A4 = −0.37068E−01
A6 = 0.35887E−02
A8 = −0.31961E−03
A10 = 0.27088E−04
A12 = −0.11570E−05

Single lens data

| Lens | Forefront surface | Focal length (mm) |
|---|---|---|
| 1 | 2 | 3.372 |
| 2 | 4 | −3.575 |
| 3 | 6 | 10.252 |
| 4 | 8 | −31.259 |

Figure 15:
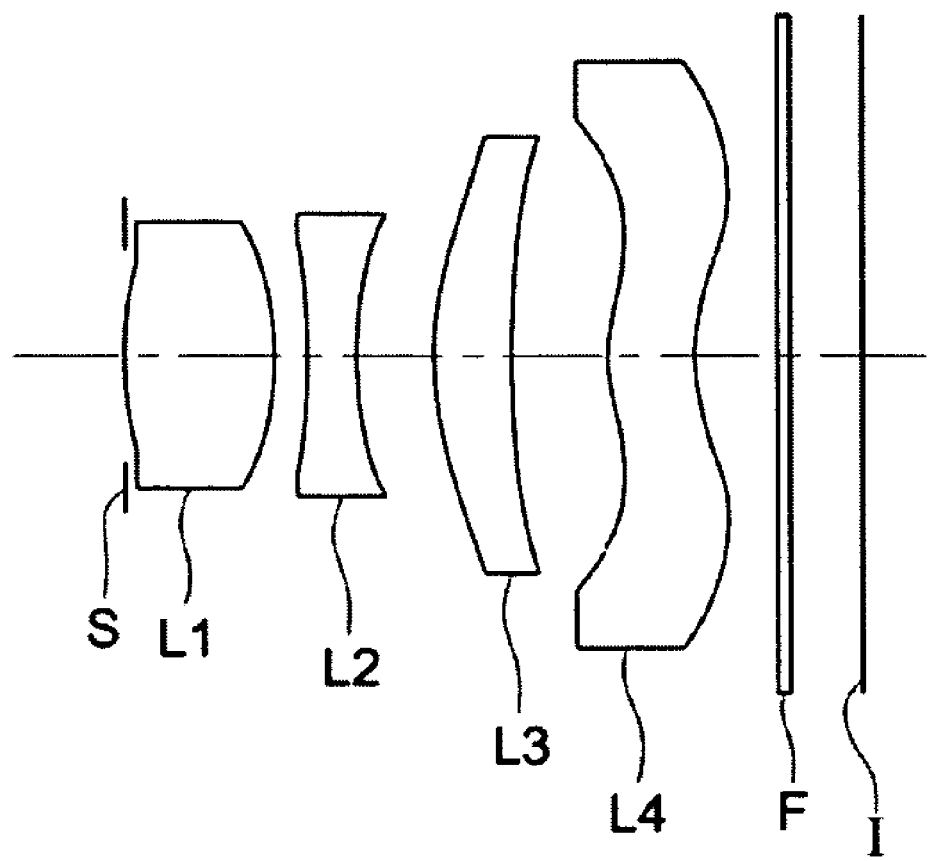
FIG. 15 is a sectional view of a lens in Example 8.
Figure 16:
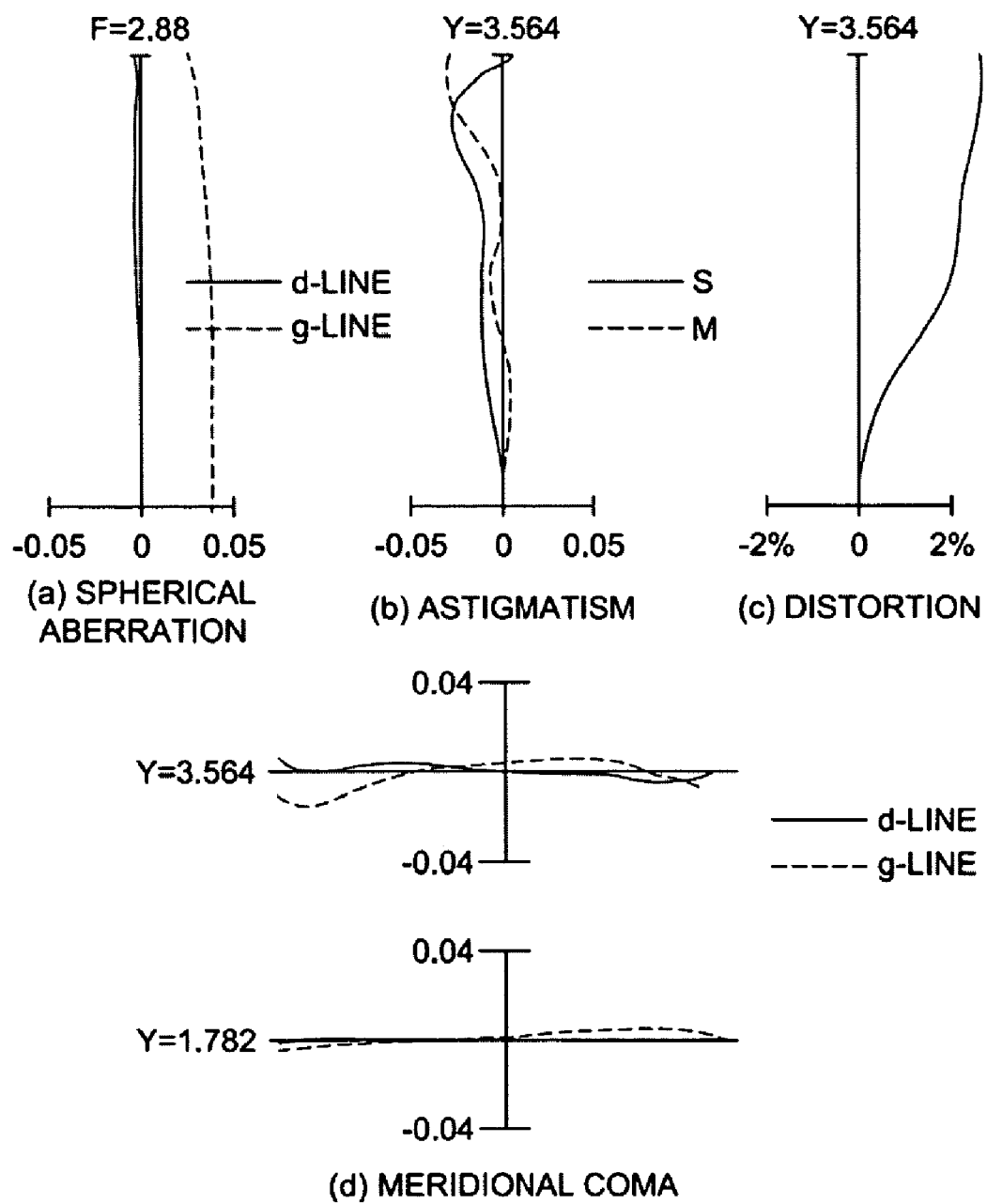
FIG. 16 is an aberration diagram of Example 8.

FIG. 15 is a sectional view of the image lens in Example 8. In the drawing, L1 represents the first lens, L2 represents the second lens, L3 represents the third lens, L4 represents the fourth lens, S represents an aperture stop and I represents an image pickup surface. Further, F represents a parallel plate with which an optical lowpass filter, an infrared blocking filter and a seal glass of a solid state image pickup element are assumed. FIG. 16 is a diagram of aberration in Example 8 including spherical aberration, astigmatism, distortion and meridional coma. In the present Example, all lenses are made of plastic material.

Values of each Example for each conditional expression are shown in Table 9.

TABLE 9

|  | Example 1 | Example 2 | Example 3 | Example 4 | Example 5 | Example 6 | Example 7 | Example 8 |
|---|---|---|---|---|---|---|---|---|
| (1) r4/f | 0.49 | 0.35 | 0.55 | 0.46 | 0.51 | 0.58 | 0.31 | 0.67 |
| (2) P3/P | 0.03 | 0.13 | 0.16 | 0.12 | 0.17 | 0.52 | 0.31 | 0.57 |
| (3) ν2 | 30.0 | 25.4 | 25.6 | 31.2 | 25.6 | 25.6 | 30.00 | 23.4 |
| (4) ν3 | 30.0 | 30.0 | 25.6 | 30.0 | 25.6 | 25.6 | 30.00 | 23.4 |
| (5) n2 | 1.583 | 1.805 | 1.615 | 1.689 | 1.615 | 1.615 | 1.58 | 1.63 |
| (6) n3 | 1.583 | 1.583 | 1.615 | 1.583 | 1.615 | 1.615 | 1.58 | 1.63 |
| (7) f1/f | 0.51 | 0.71 | 0.58 | 0.51 | 0.48 | 0.55 | 0.58 | 0.58 |
| (8) d23/f | 0.22 | 0.19 | 0.19 | 0.16 | 0.23 | 0.12 | 0.28 | 0.13 |
| (9) ν1 − ν2 | 26.0 | 38.7 | 30.4 | 30.1 | 19.4 | 30.4 | 26.0 | 32.3 |
| (10) L/f | 1.17 | 1.20 | 1.22 | 1.17 | 1.19 | 1.19 | 1.17 | 1.19 |

A refractive index change of plastic material due to temperature changes is great. Therefore, when all lenses from the first lens to the fourth lens are made to be of plastic lenses as shown in the aforesaid Examples 1, 3, 5, 6, 7 and 8, there is a fear that an image point position of the total image pickup lens system may be fluctuated when ambient temperatures changes. In the image pickup unit with specifications such that this image point position fluctuation cannot be ignored, it is possible to lighten the problem of this temperature characteristics, by making the positive first lens with relatively great refractive power and the negative second lens to be a lens made of glass material (for example, glass mold lens), as in the Examples 2 and 4, then, by making the third lens and the fourth lens to be a plastic lens, and by giving distribution of refractive power such that image point position fluctuations caused by temperature changes are cancelled each other between the third lens and the fourth lens. When the glass mold lens is used, it is preferable to use glass material whose glass transition point (Tg) is 400° C. or less, to prevent consumption of molding dies as far as possible.

In recent years, it has been known that temperature changes for plastic material can be made small by mixing inorganic mucroparticles into plastic material. In detailed explanation, it has been known that transparent plastic material in which microparticles are mixed is hardly employed as an optical material, because light is scattered and transmittance is lowered in the material. However, it is possible to make scattering not to be substantially generated, by making a size of microparticles to be smaller than a wavelength of a transmitting light flux. Although a refractive index of a plastic material is lowered when a temperature of the plastic material rises, a refractive index of inorganic particles is raised. Therefore, it is possible to make a refractive index change to be hardly generated, by causing plastic material and inorganic particle to act to cancel each other by utilizing third temperature dependence. Specifically, when inorganic particles each being 20 nanometers or less in terms of a size are dispersed in a plastic material representing base materials, the plastic material changes into a material whose refractive index has an extremely low temperature dependence. For example, by dispersing microparticles of niobium oxide ($Nb_2O_5$) into acrylic, a change in refractive index caused by temperature change can be made small. In the embodiment, by using plastic material in which the inorganic particles of this kind are dispersed for positive lens (L1) with a relatively great refractive power, or for all lenses (L1-L4), image point position fluctuation of the total image pickup lens system can be controlled to be small.

Incidentally, each of the Examples is not always designed such that an incident angle of a principal ray of the light flux that enters an image pickup surface of a solid-state image pickup element is sufficiently small at a peripheral portion of an image pickup surface. However, in the recent technology, it has become possible to reduce shading by a revision of an arrangement of a color filter of a solid-state image pickup element and an onchip-microlens-array. Specifically, if a pitch of the arrangement of the color filter and the onchip-microlens-array is designed to be slightly smaller compared with a pixel pitch of the image pickup surface of the imaging device, a light flux of oblique incidence can be guided efficiently, because the color filter and the onchip-microlens-array are shifted to an optical axis of an image pickup lens at the position which is closer to a peripheral portion of the image pickup surface. Owing to this, shading generated on the solid-state imaging device can be controlled to be small. The present Examples provide design examples in which the above design requirement about the incident angle of the principal ray is lighten and the design requirement for downsizing is stronger.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image pickup lens for forming an image of an object on a photoelectrical converter of a solid-state image pickup element, the image pickup lens comprising, in order from an object side thereof:
   an aperture stop;
   a first lens having a positive refractive power;
   a second lens having a negative refractive power and comprising a concave surface facing an image side of the image pickup lens;
   a third lens comprising an aspheric surface; and
   a fourth lens comprising an aspheric surface,
   wherein the image pickup lens satisfies following expressions:

$0.30 < f1/f < 0.85$, $0.2 < r4/f < 0.7$, and $0 < |P3/P| < 0.7$, where f1 is a focal length of the first lens,
   r4 is a curvature radius of the surface of the second lens facing the image side,
   f is a focal length of a total system of the image pickup lens,
   P3 is a refractive power of the third lens, and
   P is a refractive power of the total system of the image pickup lens.

2. The image pickup lens of claim 1, satisfying following expressions:

$$10 < v2 < 35, \text{ and}$$

$$10 < v3 < 35,$$

where v2 is an Abbe number of the second lens, and v3 is an Abbe number of the third lens.

3. The image pickup lens of claim 1, satisfying following expressions:

$$1.55 < n2 < 2.10, \text{ and}$$

$$1.55 < n3 < 2.10,$$

where n2 is a refractive index of the second lens for d line, and n3 is a refractive index of the third lens for d line.

4. The image pickup lens of claim 1, satisfying a following expression:

$$0.08 < d23/f < 0.35,$$

where d23 is a length of an air space between the second lens and the third lens along an optical axis of the image pickup lens.

5. The image pickup lens of claim 1, satisfying a following expression:

$$15 < v1 - v2 < 65,$$

where v1 is an Abbe number of the first lens, and v2 is a Abbe number of the second lens.

6. The image pickup lens of claim 1, wherein a surface of the second lens facing the image side has an aspheric shape such that a negative refractive power at a position on the surface of the second lens becomes smaller as the position moves from a center to a periphery of the surface of the second lens.

7. The image pickup lens of claim 1, wherein a surface of the third lens facing the image side has an aspheric shape such that a negative refractive power at a position on the surface of the third lens becomes smaller as the position moves from a center to a periphery of the surface of the third lens.

8. The image pickup lens of claim 1, wherein a surface of the fourth lens facing the image side has an aspheric shape such that a negative refractive power at a position on the surface of the fourth lens becomes smaller as the position moves from a center to a periphery of the surface of the fourth lens, and the surface of the fourth lens facing the image side has an inclination point.

9. The image pickup lens of claim 1, wherein each of the first to fourth lenses is formed of a plastic material.

10. The image pickup lens of claim 1, wherein each of the first and second lenses is formed of a glass material, and each of the third and fourth lenses is formed of a plastic material.

11. The image pickup lens of claim 1, wherein each of the second lens and the third lens is formed of a same material.

12. The image pickup lens of claim 1, satisfying a following expression:

$$0.30 < f1/f < 0.75.$$

13. The image pickup lens of claim 1, satisfying a following expression:

$$0.30 < f1/f < 0.71.$$

14. The image pickup lens of claim 1, satisfying a following expression:

$$0.30 < f1/f < 0.65.$$

* * * * *